US012748281B2

(12) United States Patent
Hirata

(10) Patent No.: US 12,748,281 B2
(45) Date of Patent: Sep. 29, 2026

(54) OBSERVATION SYSTEM, FOCUS POSITION CALCULATION METHOD, AND COMPUTER READABLE MEDIUM

(71) Applicant: Evident Corporation, Tatsuno-machi (JP)

(72) Inventor: Tadashi Hirata, Kamiina-gun (JP)

(73) Assignee: Evident Corporation, Kamiina-Gun (JP)

( * ) Notice: Subject to any disclaimer, the term of this patent is extended or adjusted under 35 U.S.C. 154(b) by 198 days.

(21) Appl. No.: 18/740,573

(22) Filed: Jun. 12, 2024

(65) Prior Publication Data

US 2024/0427113 A1 Dec. 26, 2024

(30) Foreign Application Priority Data

Jun. 23, 2023 (JP) ................................ 2023-102892

(51) Int. Cl.

| | |
|---|---|
| ***G02B 7/38*** | (2021.01) |
| ***G02B 21/36*** | (2006.01) |
| ***H04N 23/67*** | (2023.01) |
| ***H04N 23/74*** | (2023.01) |

(52) U.S. Cl.

CPC ............. *G02B 7/38* (2013.01); *G02B 21/365* (2013.01); *H04N 23/673* (2023.01); *H04N 23/74* (2023.01)

(58) Field of Classification Search

CPC ........ G02B 7/38; G02B 21/365; G02B 21/06; G02B 21/14; G02B 21/244; G02B 21/367; H04N 23/673; H04N 23/74

See application file for complete search history.

(56) References Cited

U.S. PATENT DOCUMENTS

| | | | | |
|---|---|---|---|---|
| 10,477,097 | B2 * | 11/2019 | Zheng | G02B 21/244 |
| 10,921,573 | B2 | 2/2021 | Stoppe et al. | |
| 2010/0208050 | A1 * | 8/2010 | Wadman | A61B 5/442 348/E7.085 |
| 2014/0267673 | A1 | 9/2014 | Yamamoto et al. | |
| 2018/0122092 | A1 | 5/2018 | Stoppe et al. | |
| 2018/0329194 | A1 * | 11/2018 | Small | G02B 21/367 |

(Continued)

FOREIGN PATENT DOCUMENTS

| | | | |
|---|---|---|---|
| DE | 102009012248 | A1 | 9/2009 |
| JP | 2014178474 | A | 9/2014 |
| JP | 2015082101 | A | 4/2015 |

OTHER PUBLICATIONS

Extended European Search Report (EESR) dated Nov. 19, 2024, issued in counterpart European Application No. 24183287.2.

*Primary Examiner* — Timothy J Henn
(74) *Attorney, Agent, or Firm* — Holtz, Holtz & Volek PC

(57) ABSTRACT

An observation system includes: an illumination device that illuminates an observation object with illumination light from a plurality of different directions; an imaging device that includes an objective that condenses light from the observation object and images the observation object with the light collected by the objective; and a control unit. The control unit calculates a focus position of the imaging device based on a plurality of image groups acquired by the imaging device at observation positions different from each other in an optical axis direction of the objective, each of the plurality of image groups including a plurality of images of the observation object illuminated from directions different from each other by the illumination device.

17 Claims, 22 Drawing Sheets

(56) References Cited

U.S. PATENT DOCUMENTS

| | | | | |
|---|---|---|---|---|
| 2019/0187450 | A1 | 6/2019 | Hirata | |
| 2019/0285401 | A1 | 9/2019 | Stoppe et al. | |
| 2019/0302440 | A1 * | 10/2019 | Stoppe ................. | G02B 21/245 |
| 2021/0149169 | A1 * | 5/2021 | Leshem ............... | G02B 21/367 |

* cited by examiner

| AREA NAME | a0 | a1 | a2 | a3 | a4 | a5 | a6 | a7 | a8 |
|---|---|---|---|---|---|---|---|---|---|
| $x_{an\_min}$ | 210 | 752 | 1294 | 210 | 752 | 1294 | 210 | 752 | 1294 |
| $x_{an\_max}$ | 751 | 1293 | 1835 | 751 | 1293 | 1835 | 751 | 1293 | 1835 |
| $y_{an\_min}$ | 160 | 160 | 160 | 499 | 499 | 499 | 838 | 838 | 838 |
| $y_{an\_max}$ | 498 | 498 | 498 | 837 | 837 | 837 | 1176 | 1176 | 1176 |

| EVALUATION AREA | a0 | a1 | a2 | a3 | a4 | a5 | a6 | a7 | a8 | | |
|---|---|---|---|---|---|---|---|---|---|---|---|
| k | 0.2911 | 0.2911 | 0.2911 | 0.3027 | 0.308 | 0.3027 | 0.325 | 0.3223 | 0.317 | AVERAGE | STANDARD DEVIATION |
| $Z_{best\_an}$ | 2190 | 2186 | 2190 | 2187 | 2184 | 2188 | 2187 | 2186 | 2185 | 2187 | 2 |

FIG. 22

| $z_{eva}$ | | | | | | | | | |
|---|---|---|---|---|---|---|---|---|---|
| 2171 | | | | | | | | | |
| EVALUATION AREA | a0 | a1 | a2 | a3 | a4 | a5 | a6 | a7 | a8 |
| $k_{an\_eva}$ | 0.125 | 0.313 | 0.125 | 0.208 | 0.313 | 0.125 | 0.354 | 0.333 | 0.313 |

OBSERVATION SYSTEM, FOCUS POSITION CALCULATION METHOD, AND COMPUTER READABLE MEDIUM

CROSS REFERENCE TO RELATED APPLICATIONS

This application is based upon and claims the benefit of priority from prior Japanese Patent Application No. 2023-102892, filed Jun. 23, 2023, the entire contents of which are incorporated herein by this reference.

TECHNICAL FIELD

The disclosure herein relates to an observation system, a focus position calculation method, and a computer-readable medium.

BACKGROUND

An autofocus technique called contrast detection AF is known. The contrast detection AF, in which a focus position is calculated based on a contrast between a plurality of images acquired while changing a position of an objective with respect to a subject in an optical axis direction, is widely used in various devices because it does not require a dedicated sensor, unlike phase detection AF.

However, in the contrast detection AF, it is difficult to accurately identify the focus position in an environment where a plurality of contrast peaks are formed in the optical axis direction. Such an environment is likely to be created, for example, when a phase object such as a cultured cell housed in a culture vessel is observed.

On the other hand, U.S. patent Ser. No. 10/921,573 proposes an autofocus technique different from the contrast detection AF, in which the focus position is geometrically calculated based on a positional relationship between images illuminated from different directions.

SUMMARY

An observation system according to an aspect of the present invention includes: an illumination device that illuminates an observation object with illumination light from a plurality of different directions; an imaging device that includes an objective that condenses light from the observation object and images the observation object with the light collected by the objective; and a control unit. The control unit calculates a focus position of the imaging device based on a plurality of image groups acquired by the imaging device at observation positions different from each other in an optical axis direction of the objective, each of the plurality of image groups including a plurality of images of the observation object illuminated from directions different from each other by the illumination device.

BRIEF DESCRIPTION OF DRAWINGS

The present invention will be more apparent from the following detailed description when the accompanying drawings are referenced.

FIG. 22 illustrates a slope and focus position in each area calculated from the shift amount function illustrated in FIGS. 21A to 21C, and a focus position of an entire image;

DESCRIPTION OF EMBODIMENTS

To geometrically calculate the focus position using the technique described in U.S. patent Ser. No. 10/921,573, it is necessary to grasp various parameters in advance. However, taking as an example the case of observing a cultured cell, the parameters can vary depending on, in addition to device settings, factors such as the shape of the culture vessel, the depth of the culture solution, and the interface shape. It is not necessarily easy to grasp these parameters for geometrically calculating the focus position in advance.

Figure 1:
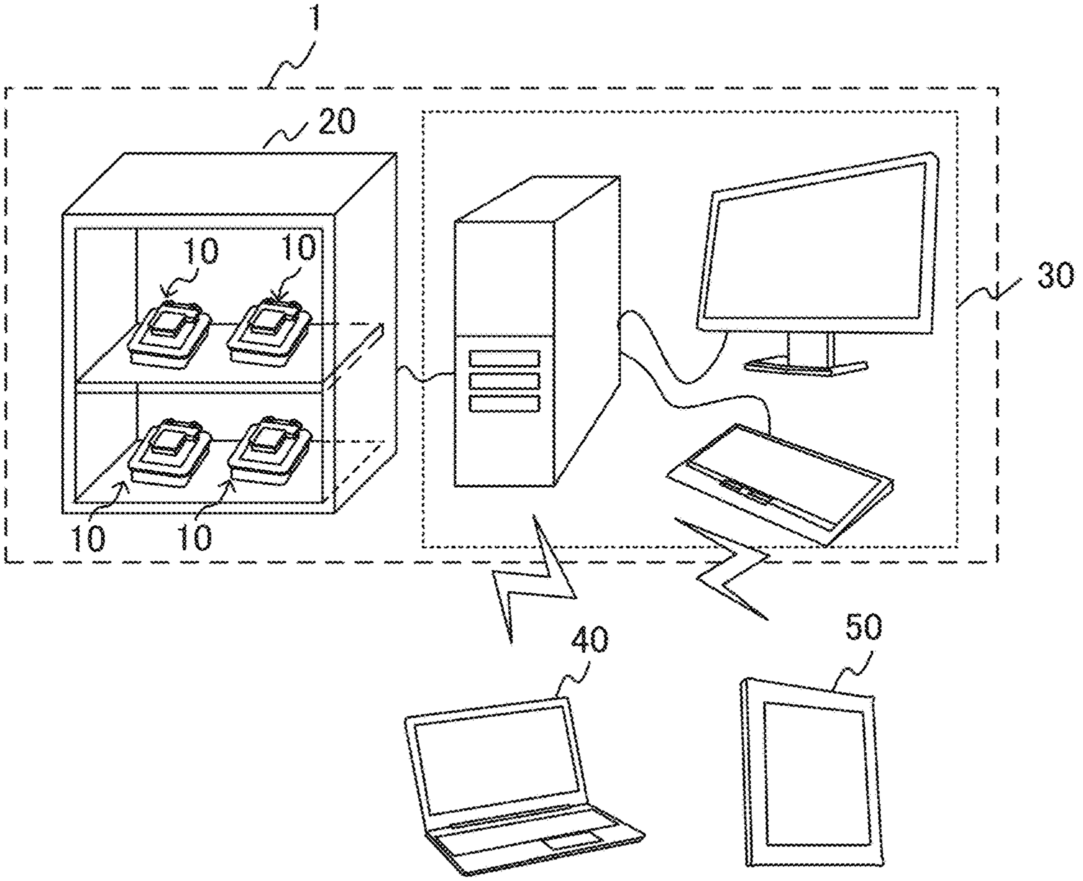
FIG. 1 is a diagram illustrating an example of a configuration of a system 1.
Figure 2:
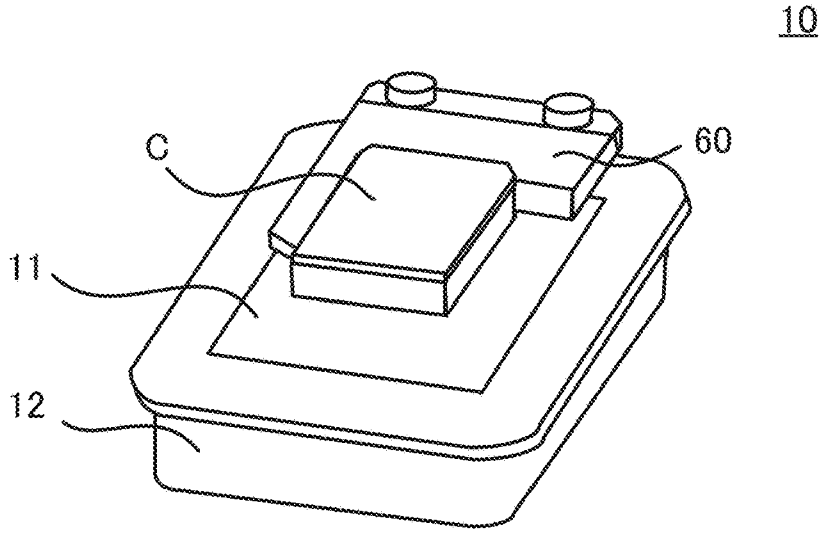
FIG. 2 is a perspective view of an observation device 10.
Figure 3:
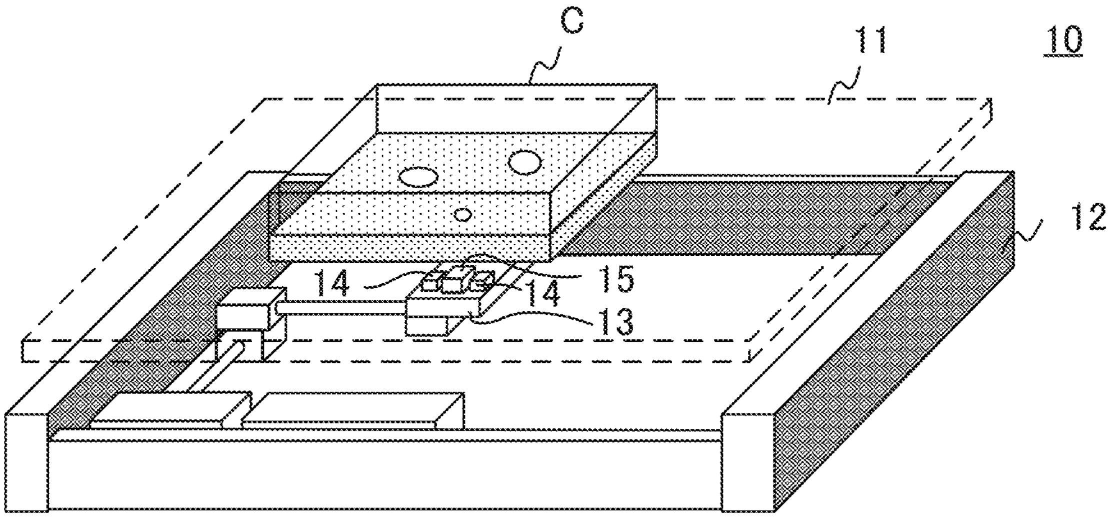
FIG. 3 is a diagram illustrating a configuration of the observation device 10.
Figure 4:
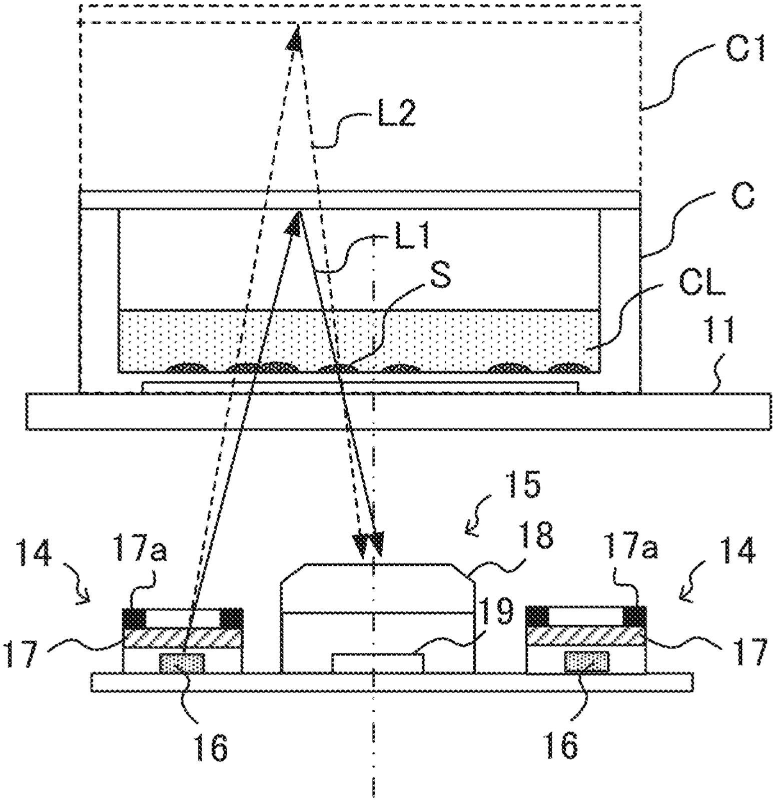
FIG. 4 is a diagram illustrating an example of a configuration of a light source unit 14 and an imaging unit 15.
Figure 5:
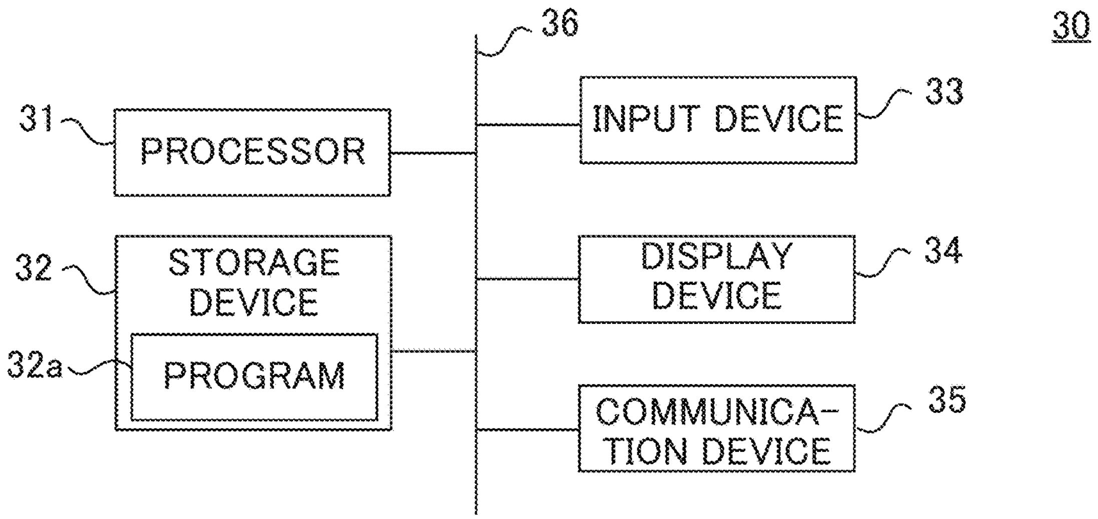
FIG. 5 is a diagram illustrating an example of a configuration of a control device 30.

FIG. 1 is a diagram illustrating an example of a configuration of a system 1. FIG. 2 is a perspective view of an observation device 10. FIG. 3 is a diagram illustrating a configuration of the observation device 10. FIG. 4 is a diagram illustrating an example of a configuration of a light source unit 14 and an imaging unit 15. FIG. 5 is a diagram illustrating an example of a configuration of a control device 30. Hereinafter, the configuration of the system 1 will be described with reference to FIG. 1 to FIG. 5.

The system 1 illustrated in FIG. 1 is an observation system used to observe a sample housed in a culture vessel CV, and acquires an image of the sample while culturing the sample. As illustrated in FIG. 1, the system 1 includes one or more observation devices 10 that image the sample housed in the culture vessel CV from a downward side of the culture vessel C to acquire the image of the sample, and a control device 30 that controls the observation devices 10.

Each of the observation devices 10 and the control device 30 are only required to exchange data with each other. Therefore, each of the observation devices 10 and the control device 30 may be connected to be communicable in a wired manner or may be connected to be communicable in a wireless manner. In addition, the sample that is an observation object is, for example, a cultured cell, and the culture vessel CV housing the sample is, for example, a flask. However, the culture vessel CV is not limited to being a flask, and may be another culture container such as a dish or a well plate.

The observation devices 10 are used, for example, in a state of being disposed in an incubator 20, as illustrated in FIG. 1, to image the sample without taking out the sample from the incubator 20. More specifically, as illustrated in FIGS. 1 and 2, the observation devices 10 are disposed in the incubator 20 in a state in which the culture vessel CV is mounted on a transmission window 11 of the observation device 10, and acquire the image of the sample in the culture vessel CV according to an instruction from the control device 30. The transmission window 11 is a transparent top plate constituting an upper surface of a housing 12 of the observation device 10, and constitutes a mounting surface on which the culture vessel CV is mounted. The transmission window 11 is made of glass or a transparent resin, for example.

As illustrated in FIG. 2, the observation device 10 includes the box-shaped housing 12 including the transparent transmission window 11 on which the culture vessel CV is mounted as an upper surface, and a positioning member 60 that positions the culture vessel CV at a predetermined position on the transmission window 11 (mounting surface). Note that the positioning member 60 is fixed to the housing 12. However, the positioning member 60 can be removed as necessary, and may be replaced with another positioning member having a different shape depending on the container used.

As illustrated in FIGS. 3 and 4, the observation device 10 further includes a stage 13 that moves inside the housing 12, a pair of light source units 14 that illuminate the sample S, and an imaging unit 15 that images the sample. The stage 13, the light source units 14, and the imaging unit 15 are housed inside the housing 12. The light source units 14 and the imaging unit 15 are installed on the stage 13, and move with respect to the culture vessel CV as the stage 13 moves in the housing 12.

The stage 13 is an example of a mobile unit of the observation device 10, and changes the relative position of the imaging unit 15 with respect to the culture vessel CV. The stage 13 is movable in an x direction and a y direction which are parallel to the transmission window 11 (the mounting surface) and orthogonal to each other. In addition, the stage 13 is further movable in a z direction orthogonal to both the x direction and the y direction. The z direction is an optical axis direction of an observation optical system 18 of the imaging unit 15 to be described later.

Note that FIGS. 3 and 4 illustrate an example in which the light source units 14 and the imaging unit 15 are installed on the stage 13, and as a result, move integrally in the housing 12, but the light source units 14 and the imaging unit 15 may move independently in the housing 12. In addition, FIGS. 3 and 4 illustrate an example in which the pair of the light source units 14 are disposed on the left and right of the imaging unit 15, but the arrangement and the number of the light source units 14 are not limited to this example. For example, three or more light source units 14 may be provided on the stage 13, or only one light source unit 14 may be provided thereon.

The pair of light source units 14 are an example of an illumination device of the system 1. The pair of light source units 14 are provided at symmetrical positions with respect to an optical axis of the observation optical system 18 to be described later, and illuminates the sample S that is an observation object with illumination light from two different directions. As illustrated in FIG. 4, each of the light source units 14 includes a light source 16 and a diffusion plate 17. That is, the pair of light source units 14 includes the plurality of light sources 16 provided at symmetrical positions with respect to the optical axis of the observation optical system 18, and selectively causes the plurality of light sources 16 to emit light to illuminate the sample S that is an observation object with illumination light from two symmetrical directions.

The light source 16 includes, for example, a light-emitting diode (LED) or the like. The light source 16 may include a white LED or a plurality of LEDs that emit light of a plurality of different wavelengths, such as R (red), G (green), and B (blue). Light emitted from the light source 16 enters the diffusion plate 17.

The diffusion plate 17 diffuses the light emitted from the light source 16. The diffusion plate 17 is not particularly limited, and may be a frosted-type of diffusion plate having asperities formed on its surface. However, the diffusion plate 17 may be an opal-type diffusion plate having a coated surface, or may be another type of diffusion plate. Further, a mask 17*a* for limiting the emission region of the diffused light may be formed on the diffusion plate 17. The light emitted from the diffusion plate 17 travels in various directions.

The imaging unit 15 is an example of an imaging device of the system 1. As illustrated in FIG. 4, the imaging unit 15 includes the observation optical system 18 and an imaging element 19. The observation optical system 18 condenses light entering the housing 12 by being transmitted through the transmission window 11. The observation optical system 18 is not particularly limited, but is, for example, a finite distance correction-type objective that forms an image in a finite position. However, the optical system 18 may include an infinity-corrected objective, and a finite distance correction optical system is only required to be configured as the entire optical system 18. The observation optical system 18, which is focused on the bottom surface of the culture vessel CV in which the sample S is present, condenses light entering the housing 12 on the imaging element 19, thereby forming an optical image of the sample S on the imaging element 19.

The imaging element 19 is a photosensor that converts detected light to an electrical signal. Specifically, the imaging element 19 is an image sensor, and is, for example, a charge-coupled device (CCD) image sensor, a complementary MOS (CMOS) image sensor, or the like, although not limited thereto. The imaging unit 15 includes the objective that condenses light from the observation object (sample S), and images the observation object (sample S) with the light condensed by the objective using the imaging element 19.

In the observation device 10 configured as described above, oblique illumination is adopted to visualize the sample S that is a phase object in the culture vessel CV. Specifically, the light emitted by the light source 16 is diffused by the diffusion plate 17 and is emitted to outside the housing 12 without passing through the observation optical system 18. Thereafter, a portion of the light emitted to outside the housing 12 is deflected above the sample S, for example, by being reflected by the upper surface or the like of the culture vessel CV, the sample S is irradiated with a portion of the light deflected above the sample S, the portion of light enters the housing 12 by being transmitted through the sample S and the transmission window 11. Then, a portion of the light entering the housing 12 is condensed by the observation optical system 18 and forms the image of the sample S on the imaging element 19. Finally, the observation device 10 generates the image of the sample based on the electric signal output from the imaging element 19 and outputs the image of the sample to the control device 30.

Note that the angle of the light transmitted through the sample S and entering the observation optical system 18 is not determined only by various settings of the observation device 10, but is also changed due to factors other than the observation device 10 such as the culture vessel. For example, as illustrated in FIG. 4, the incident angle is different between light beam L1 entering the observation optical system 18 via the sample S when the culture vessel CV is used and light beam L2 entering the observation optical system 18 via the sample S when the culture vessel CV1 having a height different from that of the culture vessel CV is used. In addition, the incident angle to the observation optical system 18 varies between a case where the interface of a culture solution CL is curved due to surface tension and a case where the interface is approximately flat because the refractive power at the interface is different. Thus, in the system 1, it is not necessarily easy to identify information on the incident angle or the like in advance.

The control device 30 is a device that controls the observation device 10, and is an example of a control unit of the system 1. The control device 30 controls the stage 13, the light source unit 14, and the imaging unit 15. Note that the control device 30 is only required to include a processor 31 and a storage device 32, and may be a standard computer.

The control device 30 includes, for example, as illustrated in FIG. 5, a processor 31, a storage device 32, an input device 33, a display device 34, and a communication device 35, which may be connected with each other via a bus 36.

The processor 31 is hardware including, for example, a CPU (central processing unit), a GPU (graphics processing unit), and a DSP (digital signal processor), or the like, and performs programmed processing by executing a program 32*a* stored in the storage device 32. In addition, the processor 31 may include, for example, an application specific integrated circuit (ASIC) or a field-programmable gate array (FPGA).

The storage device 32 may include, for example, one or more arbitrary semiconductor memories and may also include one or more other storage devices. The semiconductor memories include, for example, a volatile memory such as a random access memory (RAM), and a nonvolatile memory such as a read only memory (ROM), a programmable ROM, and a flash memory. The RAM may include, for example, a DRAM (dynamic random access memory) and an SRAM (static random access memory), or the like. The other storage devices may include, for example, a magnetic storage device including a magnetic disk, an optical storage device including an optical disk, and the like.

Note that the storage device 32 is a non-transitory computer-readable medium and is an example of a storage unit of the system 1. The storage device 32 stores various types of information calculated in autofocus processing to be described later (referred to as autofocus information), and the like, in addition to the program 32*a* and the image of the sample captured by the observation device 10.

The input device 33 is a device that is directly operated by a user. Examples thereof include a keyboard, a mouse, and a touch panel. Examples of the display device 34 include a liquid crystal display, an organic EL display, and a CRT (cathode ray tube) display, or the like. The display may include a built-in touch panel. The communication device 35 may be a wired communication module or a wireless communication module.

The configuration illustrated in FIG. 5 is an example of a hardware configuration of the control device 30, and the control device 30 is not limited to this configuration. The control device 30 is not limited to a general-purpose device and may be a dedicated device.

The observation device 10 acquires the image of the sample S according to an instruction from the control device 30. The control device 30 transmits an image acquisition instruction to the observation device 10 placed in the incubator 20, and receives the image acquired by the observation device 10. The control device 30 may display the image acquired by the observation device 10 on the display device 34 included in the control device 30, whereby the system 1 may provide the user with the image of the sample S being cultured and provide the user with the image of the sample S to observe the sample. Note that the control device 30 may communicate with a client terminal (a client terminal 40 and a client terminal 50) illustrated in FIG. 1 and display the image acquired by the observation device 10 on a display device included in the client terminal.

In the system 1 configured as described above, the control device 30 controls the observation device 10, so that the autofocus processing is executed and the image of the focused sample S (hereinafter referred to as a focus image) is acquired. As a result, the user can observe the sample S in the focus image. Hereinafter, processing performed by the system 1 to acquire the focus image will be described with reference to FIGS. 6 to 14.

Figure 6:
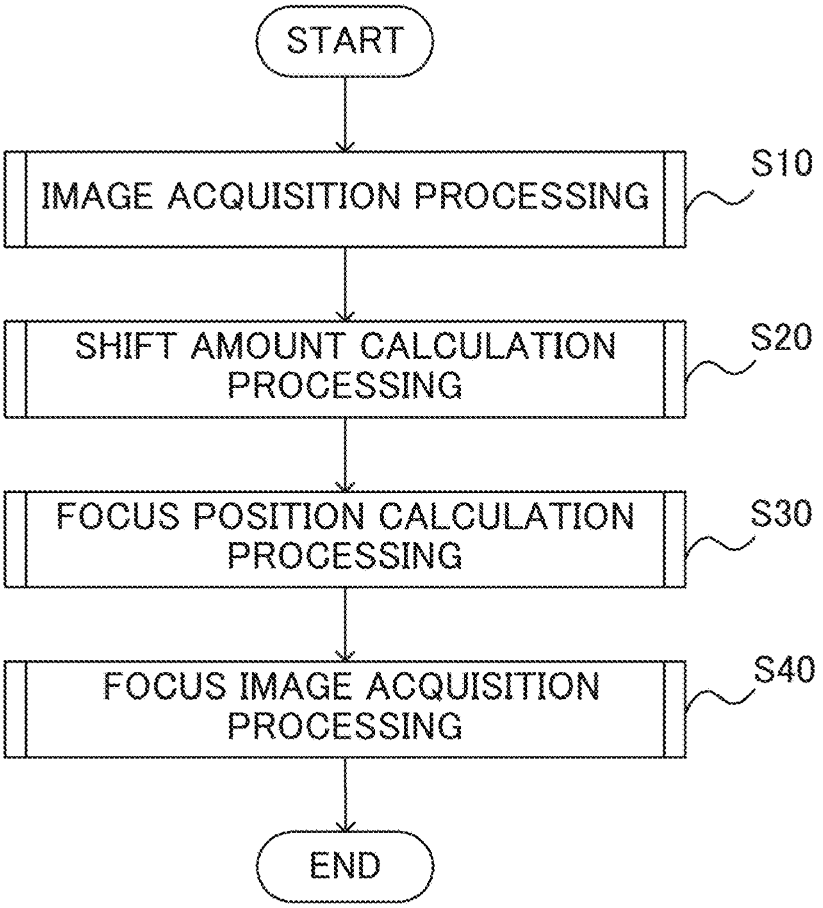
FIG. 6 is a flowchart of processing performed by the system 1.
Figure 7:
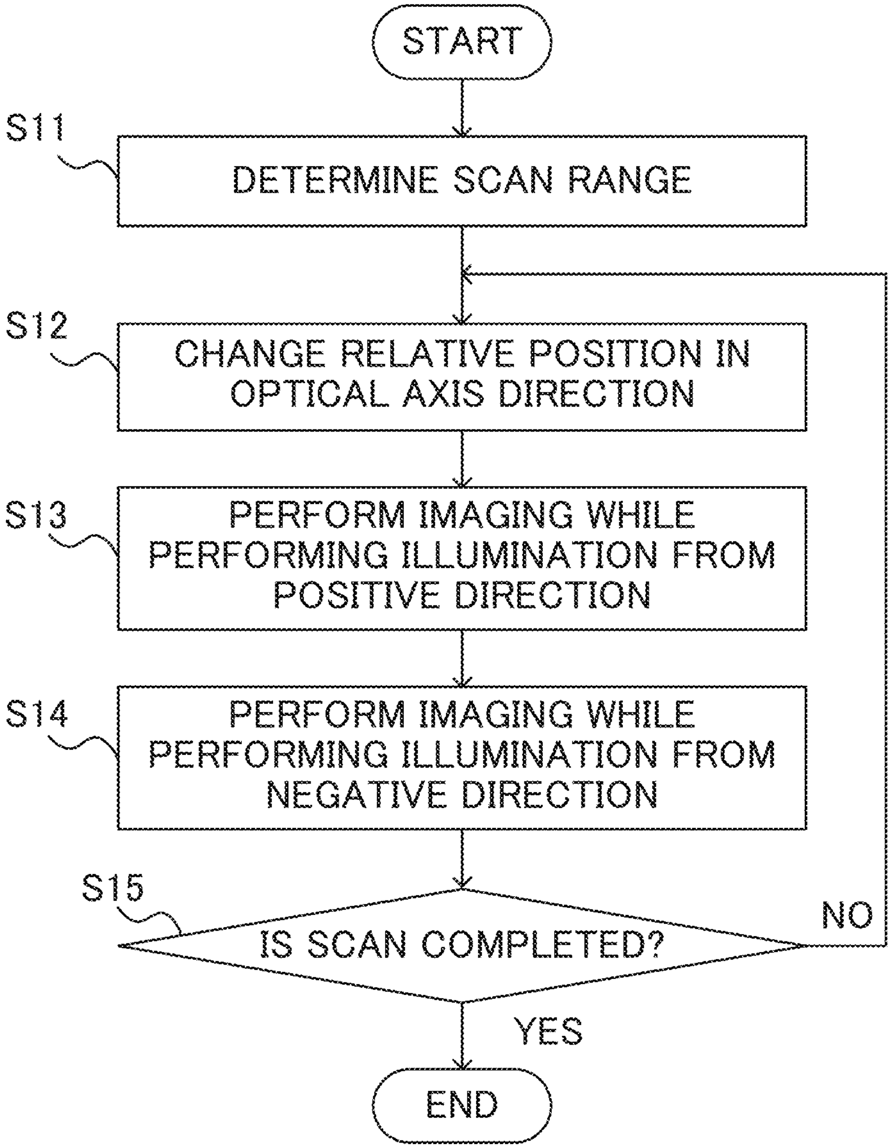
FIG. 7 is a flowchart of image acquisition processing illustrated in FIG. 6.
Figure 8:
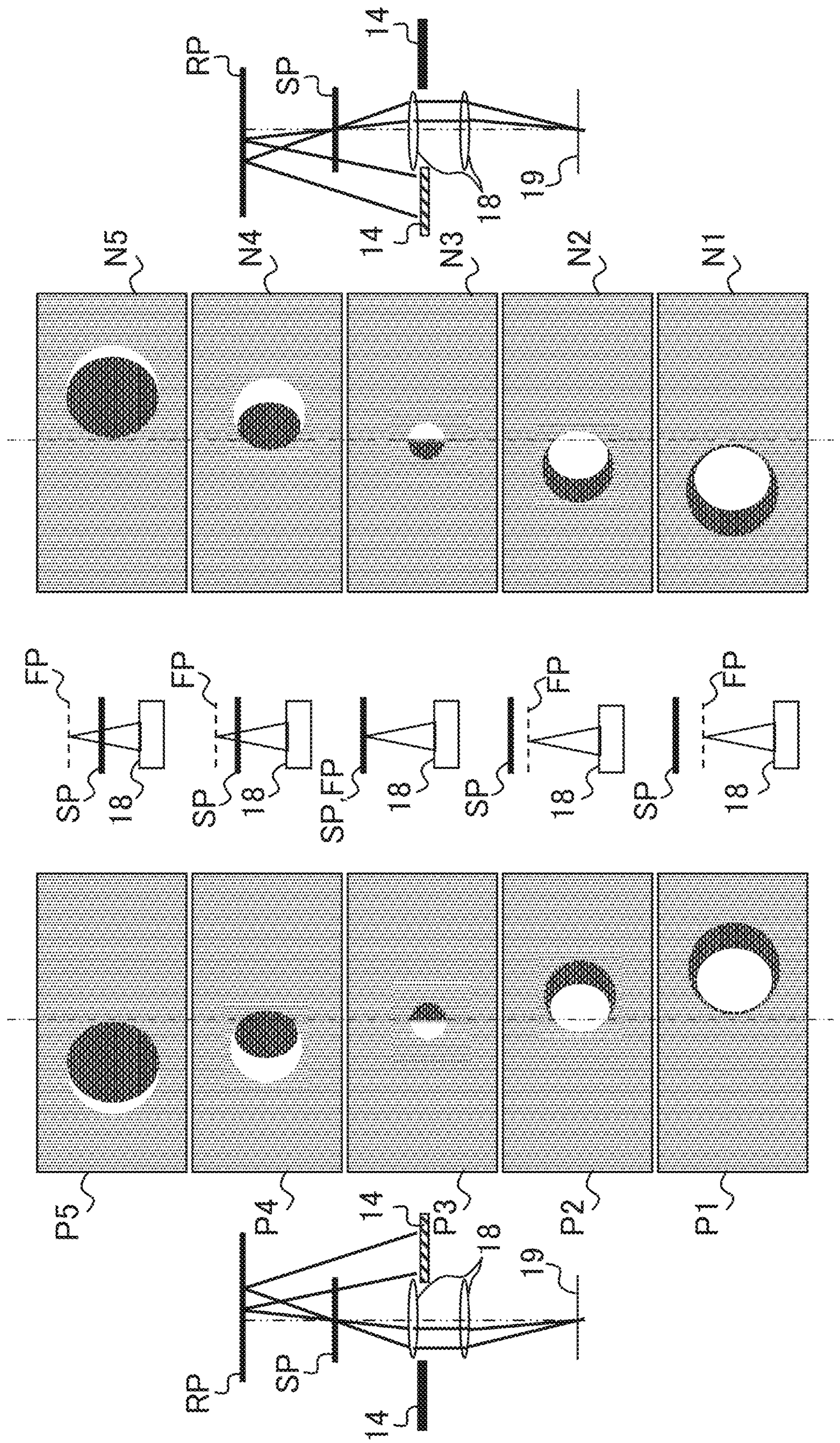
FIG. 8 is a diagram illustrating an example of a change in a preliminary image depending on an observation position.
Figure 9:
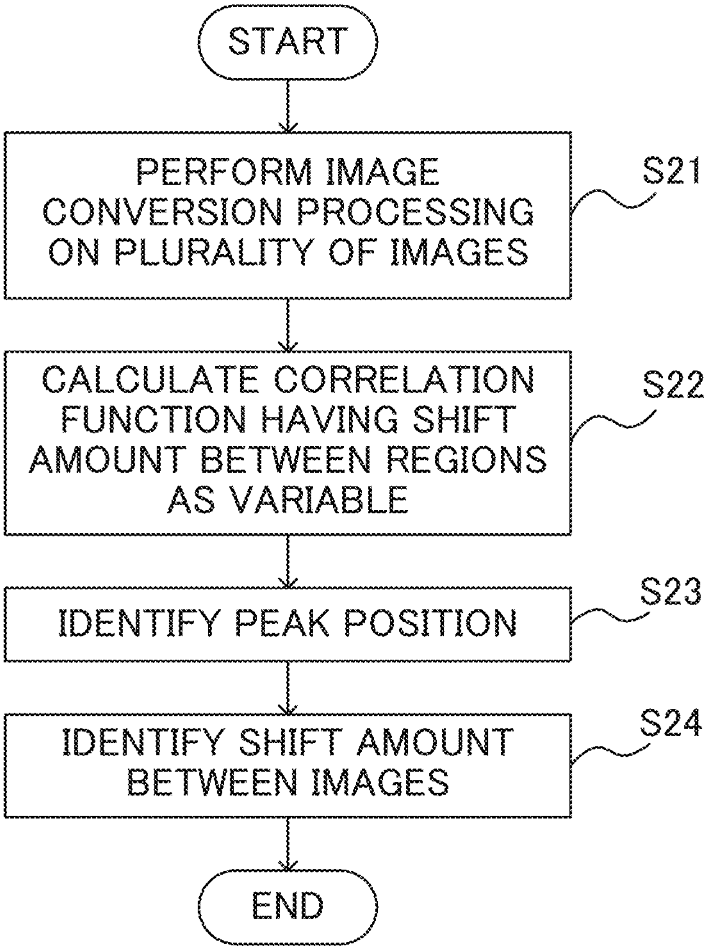
FIG. 9 is a flowchart of shift amount calculation processing illustrated in FIG. 6.
Figure 10:
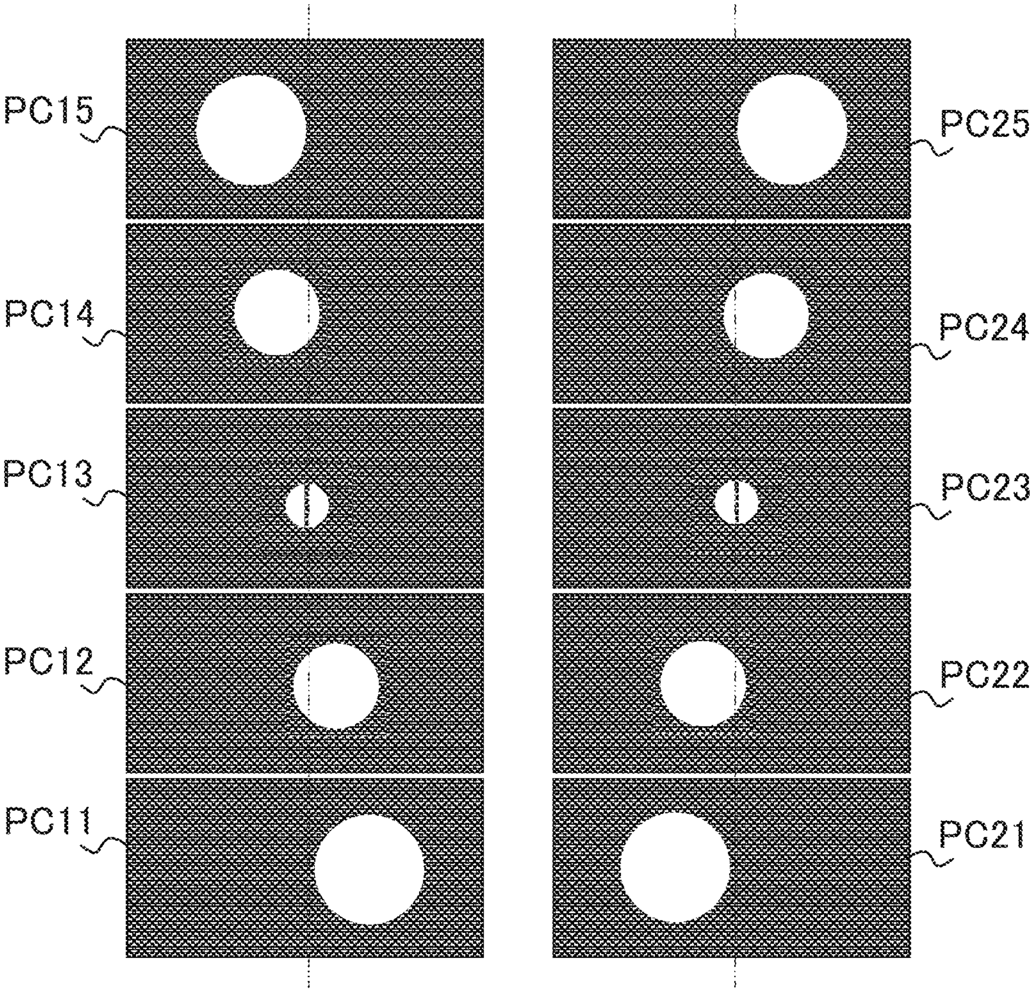
FIG. 10 is a diagram illustrating an example of a positive contrast image obtained from the preliminary image illustrated in FIG. 8.
Figure 11:
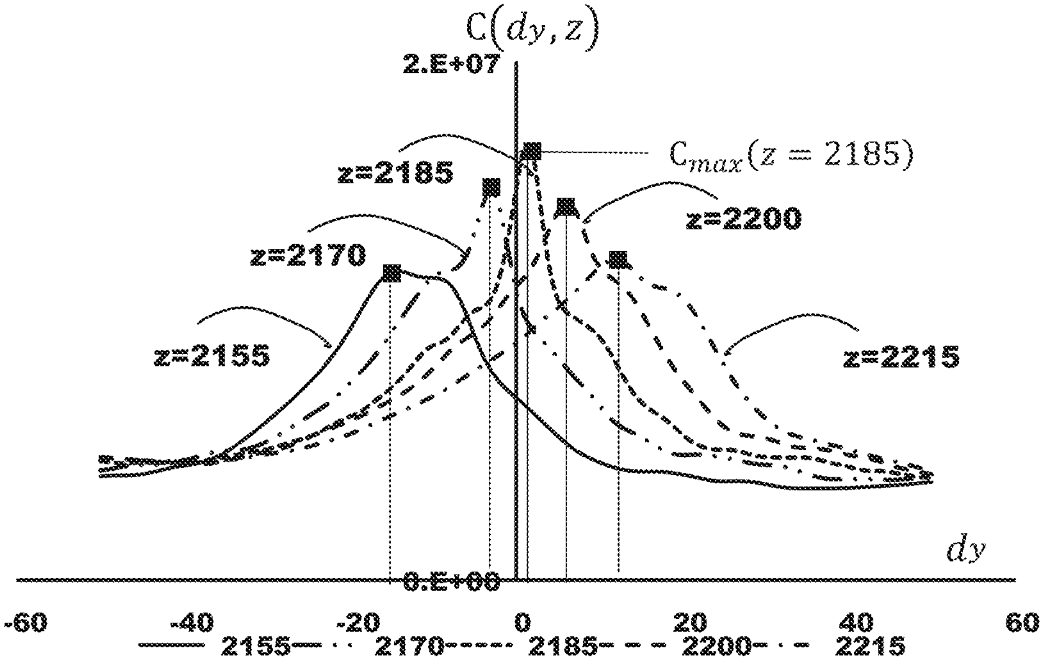
FIG. 11 is a graph illustrating a cross-correlation function at each observation position.
Figure 12:
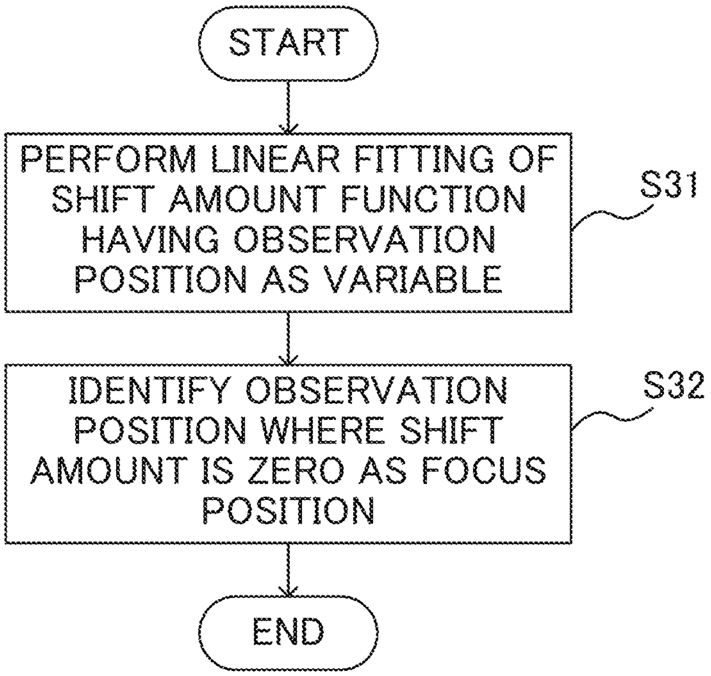
FIG. 12 is a flowchart of focus position calculation processing illustrated in FIG. 6.
Figure 13:
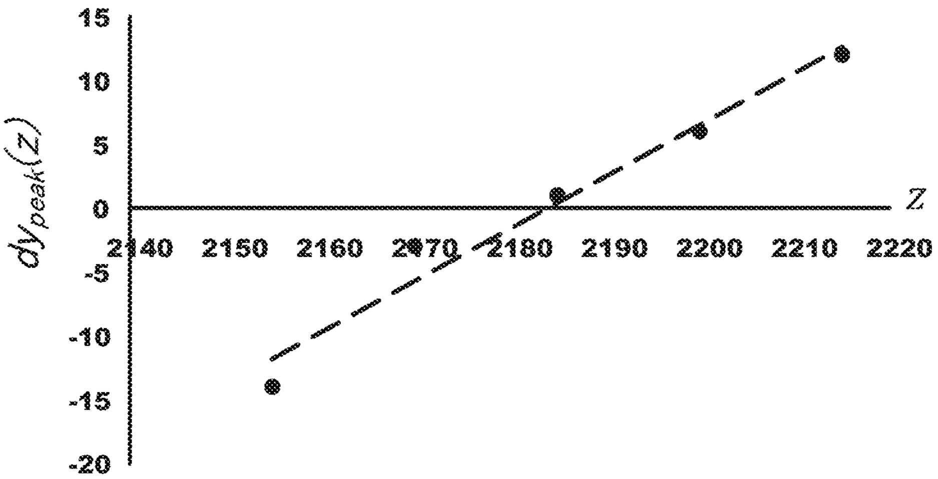
FIG. 13 is a graph illustrating a shift amount function in which the shift amount is linearly fitted to the observation position.
Figure 14:
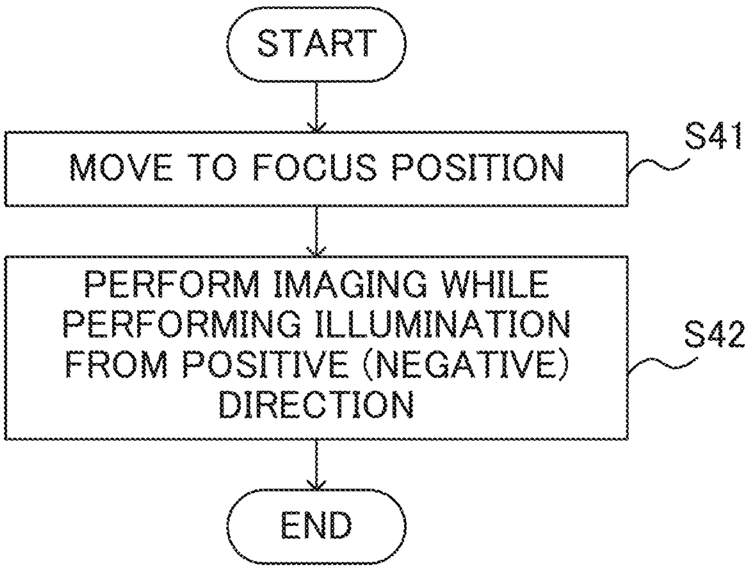
FIG. 14 is a flowchart of focus image acquisition processing illustrated in FIG. 6.

FIG. 6 is a flowchart of processing performed by the system 1. FIG. 7 is a flowchart of image acquisition processing illustrated in FIG. 6. FIG. 8 is a diagram illustrating an example of a change in a preliminary image depending on an observation position. FIG. 9 is a flowchart of shift amount calculation processing illustrated in FIG. 6. FIG. 10 is a diagram illustrating an example of a positive contrast image obtained from the preliminary image illustrated in FIG. 8. FIG. 11 is a graph illustrating a cross-correlation function at each observation position. FIG. 12 is a flowchart of focus position calculation processing illustrated in FIG. 6. FIG. 13 is a graph illustrating a shift amount function in which the shift amount is linearly fitted to the observation position. FIG. 14 is a flowchart of focus image acquisition processing illustrated in FIG. 6.

The processing illustrated in FIG. 6 is started when the processor 31 executes the program stored in the storage device 32. The processing illustrated in FIG. 6 includes image acquisition processing, shift amount calculation processing, focus position calculation processing, and focus image acquisition processing.

First, the processor 31 performs the image acquisition processing of acquiring the preliminary image by controlling the observation device 10 (step S10). More specifically, the processor 31 controls the observation device 10 to switch the illumination direction at each observation position and acquire the plurality of preliminary images by performing the image acquisition processing illustrated in FIG. 7.

The preliminary image refers to an image used to calculate a focus position, and is used in the shift amount calculation processing and the focus position calculation processing to be described in detail later. Note that the focus position refers to a relative position of the imaging unit 15 when the focus image is acquired among relative positions of the imaging unit 15 with respect to the sample S (culture vessel CV) (hereinafter, simply the relative position of the imaging unit 15). In addition, a relative position of the imaging unit 15 when the preliminary image is acquired among the relative positions of the imaging unit 15 is referred to as the observation position.

In the image acquisition process, as illustrated in FIG. 7, the processor 31 first determines a scan range (step S11). The scan range refers to a range of the observation position in the optical axis direction (Z direction) when the preliminary image is acquired, and is also referred to as a z search range.

In step S11, the processor 31 may determine the scan range based on, for example, information on the container stored in the storage device 32. The preliminary image is desirably acquired near the focus position, and the range where the focus position is present is limited to some extent by the culture vessel CV housing the sample S. For this reason, the processor 31 may determine the scan range including the vicinity of the focus position based on the information on the container.

When the scan range is determined, the processor 31 specifies the scan range and instructs the observation device 10 to acquire the preliminary image. Thus, the observation device 10 repeats processing from step S12 to step S15 to acquire the preliminary images. That is, the processor 31 causes the observation device 10 to perform the processing from step S12 to step S15.

First, the observation device 10 controls the stage 13 to change the relative position of the imaging unit 15 in the optical axis direction (step S12). Here, the observation device 10 moves the relative position to the lower limit of the scan range, that is, the lower end among the plurality of observation positions within the scan range based on the scan range specified by the control device 30.

When the relative position is moved to the observation position, the observation device 10 controls the imaging unit 15 to image the sample S while controlling the light source unit 14 to illuminate the sample S from a positive direction (step S13). Thus, the preliminary image of the sample S illuminated from the positive direction is acquired.

Furthermore, the observation device 10 controls the imaging unit 15 to image the sample S while controlling the light source unit 14 to illuminate the sample S from a negative direction (step S14). Thus, the preliminary image of the sample S illuminated from the negative direction is acquired.

Thereafter, the observation device 10 determines whether scanning has been completed, that is, whether the preliminary images have been acquired at all the observation positions within the scan range (step S15). When determining that the scanning has not been completed, the observation device 10 moves the relative position to the next observation position in step S12, and acquires the preliminary image at the new observation position in steps S13 and S14. The observation device 10 repeats the processing from step S12 to step S15 until the preliminary images are acquired at all the observation positions within the scan range, and ends the image acquisition processing illustrated in FIG. 7.

As described above, in the image acquisition processing illustrated in FIG. 7, the observation device 10 repeats imaging by switching the illumination direction at each observation position while changing the observation position. Thus, the plurality of preliminary images of the sample S illuminated from directions different from each other by the pair of light source units 14 are acquired at each observation position.

FIG. 8 illustrates an example of the preliminary image obtained by the image acquisition processing illustrated in FIG. 7. Images P1 to P5 are images acquired at different observation positions in the optical axis direction during illumination in the positive direction, and the images N1 to N5 are images acquired at different observation positions in the optical axis direction during illumination in the negative direction.

Hereinafter, a plurality of preliminary images of the sample S obtained at the same observation position and illuminated from directions different from each other by the illumination device (the pair of light source units 14) will be referred to as an image group. In FIG. 8, each pair of the image P1 and the image N1, the image P2 and the image N2, the image P3 and the image N3, the image P4 and the image N4, and the image P5 and the image N5 acquired at the same observation position constitutes the image group, and a total of five image groups are illustrated.

In other words, the processor 31 acquires a plurality of image groups acquired by the imaging unit 15 at observation positions different from each other in the optical axis direction of the objective included in the observation optical system 18 from the observation device 10 by performing the image acquisition processing illustrated in FIG. 7.

As illustrated in FIG. 8, in the preliminary image that is an oblique illumination image, when a focal plane FP and a sample plane SP coincide with each other, that is, when the sample plane SP is in focus, a subject positioned on the optical axis of the observation optical system 18 (objective) appears at the image center in the preliminary image. This state is illustrated in the image P3 and the image N3.

On the other hand, when the focal plane FP and the sample plane SP do not coincide with each other, that is, when the sample plane SP is not in focus, the subject appears at a position shifted from the image center in the preliminary image. The magnitude of the shift from the image center increases as the distance between the focal plane FP and the sample plane SP increases. This can be confirmed, for example, by comparing the image P1 and the image P2. In addition, the direction of the shift from the image center is determined by the illumination direction, and the shift occurs in the opposite direction between two images obtained by illuminating from the opposite directions. This can be confirmed, for example, by comparing the image P1 and the image N1.

Note that, although the case where the subject is on the optical axis has been described as an example, the correspondence relationship between the position of the subject on the sample plane and the position of the subject in the image is the same between a case where the subject is on the optical axis and a case where the subject is at a position shifted from the optical axis. When the subject is not on the optical axis and the subject is in focus, the subject appears at a position that is not the center in the preliminary image corresponding to the position of the subject on the sample plane. That is, when the focal plane FP and the sample plane SP coincide with each other, that is, when the sample plane SP is in focus, the subject appears at the same position as that on the sample plane in the preliminary image. On the other hand, when the focal plane FP and the sample plane SP do not coincide with each other, that is, when the sample plane SP is not in focus, the subject appears at a position different from that on the sample plane in the preliminary image.

When the preliminary image is acquired by the image acquisition processing illustrated in FIG. 7, the processor 31 performs the shift amount calculation processing and the focus position calculation processing using the preliminary image (the plurality of image groups) acquired from the observation device 10 by using the features of the preliminary image (the oblique illumination image) described above (step S20, step S30).

First, the processor 31 calculates the shift amount in the direction orthogonal to the optical axis of the objective (observation optical system 18) between the plurality of preliminary images based on the plurality of preliminary images constituting the same image group by performing the shift amount calculation processing illustrated in FIG. 9 (step S20). Note that the shift amount calculation processing is performed for each image group (observation position), and the shift amount between the preliminary images constituting the image group is calculated for each image group (observation position).

As illustrated in FIG. 8, in the preliminary image that is an oblique illumination image, the sample S is represented by a bright portion and a dark portion with respect to the background. In addition, in the two preliminary images constituting the image group and having opposite illumination directions, the bright portion and the dark portion in the preliminary image are approximately inverted. This relationship becomes more remarkable as the sample becomes in focus.

Then, to facilitate the comparison of the position of the sample S between the two preliminary images, in the shift amount calculation processing illustrated in FIG. 9, the processor 31 first performs image conversion processing on the two preliminary images constituting the image group (step S21). Here, the processor 31 performs the image conversion on the two preliminary images such that the sample S is represented by one of the bright portion and the dark portion with respect to the background. More specifically, the processor 31 performs image conversion to convert each of the two preliminary images into a positive contrast image or a negative contrast image.

FIG. 10 illustrates the positive contrast image obtained by performing the image conversion processing in step S21 on the images P1 to P5 and the images N1 to N5 illustrated in FIG. 8 (images PC 11 to PC 15 and images PC 21 to 25). The positive contrast image is an image in which the sample S is represented by a brighter portion than the background. In the image conversion processing in step S21, the preliminary image may be converted into the negative contrast image in which the sample S is represented by a darker portion than the background.

When the types of the two images constituting each image group are unified into the two positive contrast images by the image conversion processing, the processor 31 calculates a correlation function for each image group (each observation position) (step S22). The correlation function calculated in step S22 is a cross-correlation function between two images (positive contrast images) constituting the image group. This cross-correlation function is a function obtained by calculating a correlation between two regions, each of which is a part of one of the two images, using a position shift amount between the two regions as a variable. Note that the position shift amount is an amount indicating a difference in position between the two regions in the images, and more specifically, an amount indicating a difference in position with respect to the illumination direction.

When the correlation function is calculated, the processor 31 identifies a peak position (step S23). FIG. 11 illustrates a correlation function C having a position shift amount dy as a variable, calculated at each of observation positions z in step S22. In step S23, the processor 31 identifies a peak position $dy_{peak}$ (that is, the position shift amount at which the correlation value is maximum) of the correlation function illustrated in FIG. 11 at each observation position z.

When the peak position is identified, the processor 31 identifies the shift amount between the two images constituting each image group (step S24). The peak position indicates a positional relationship between two regions whose correlation indicates a peak, that is, a positional relationship between two regions that is most similar between the two images. Therefore, since the position shift amount indicated by the peak position is considered to be the shift amount of the position of the subject appearing in the image, it can be regarded as the shift amount between the two images. In step S24, the processor 31 identifies the shift amount by regarding the position shift amount indicated by the peak position as the shift amount between the two images.

As described above, in the shift amount calculation processing illustrated in FIG. 9, the processor 31 calculates the correlation between the two regions in the two images in the processing of steps S21 and S22, and calculates the shift amount between the two images from the positional relationship between the two regions whose correlation indicates the peak in steps S23 and S24.

When the shift amount at each observation position is calculated by the shift amount calculation processing illustrated in FIG. 9, the processor 31 calculates the focus position based on a plurality of shift amounts corresponding to observation positions different from each other in the optical axis direction by performing the focus position calculation processing illustrated in FIG. 12 (step S30).

As described above with reference to FIG. 8, in a case where the subject is not in focus, the subject positioned on the optical axis appears at the position shifted from the image center in the direction according to the illumination direction, whereas in a case where the subject is in focus, the subject appears at the image center regardless of the illumination direction. Thus, the focus position can be regarded as an observation position where the shift amount between the images is zero. In addition, the greater the focus shift, the larger the shift amount caused when the subject is not in focus. Therefore, it is possible to estimate the observation position where the shift amount is zero by fitting the shift amount obtained for each observation position.

First, the processor 31 calculates a shift amount function having the observation position as a variable by linear fitting (step S31). Here, the processor 31 calculates a linear shift amount function with respect to the observation position using the least squares method based on the plurality of shift amounts calculated for each observation position in the shift amount calculation processing. The broken line illustrated in FIG. 13 is the shift amount function calculated in step S31. FIG. 13 illustrates a state in which the shift amount function is calculated by linear fitting for the plurality of shift amounts.

Thereafter, the processor 31 identifies, as the focus position, the observation position where the shift amount estimated based on the shift amount function is zero (step S32). Here, the processor 31 estimates the observation position by substituting zero into the shift amount of the shift amount function, and identifies the estimated observation position as the focus position. In the graph illustrated in FIG. 13, the focus position corresponds to the z-intercept.

When the focus position is calculated by the focus position calculation processing illustrated in FIG. 12, the processor 31 controls the observation device 10 to acquire the image at the focus position by performing the focus image acquisition processing illustrated in FIG. 14 (step S40).

In the focus image acquisition processing, the processor 31 specifies the focus position and instructs the observation device 10 to acquire the focus image. Then, the observation device 10 first controls the stage 13 to move the relative position of the imaging unit 15 to the focus position (step S41). Thereafter, the observation device 10 controls the imaging unit 15 to image the sample S while controlling the light source unit 14 to illuminate the sample S from the positive direction (or the negative direction) (step S42). As a result, the focus image is acquired. The image acquired by the observation device 10 is output to the control device 30.

The control device 30 may display the focus image received from the observation device 10 on the display device 34. In addition, the control device 30 may transmit the focus image to the client terminal (the client terminal 40 or the client terminal 50) to display the focus image on the display device of the client terminal.

As described above, in the processing illustrated in FIG. 6, the processor 31 calculates the focus position of the imaging unit 15 based on the plurality of image groups acquired by the imaging unit 15 at the observation positions different from each other in the optical axis direction of the objective. Each of the plurality of image groups includes a plurality of images of the observation object illuminated from directions different from each other by the pair of light source units 14. The processor 31 can specify, based on the plurality of image group, how the difference in the appearance of the subject illuminated from different illumination directions changes according to the observation position, and calculates the focus position based on the change. Therefore, according to the system 1, the focus position can be accurately calculated without preparing detailed parameter information in advance.

In addition, in the processing illustrated in FIG. 6, the processor 31 calculates the shift amount between the images constituting the image group, and calculates the focus position based on the plurality of shift amounts corresponding to observation positions different from each other in the optical axis direction. Thus, since the focus position is calculated based on the shift amount instead of the contrast level, the system 1 can calculate the focus position even in an environment where a plurality of contrast peaks can be formed.

Hereinafter, a specific example of the processing illustrated in FIG. 6 will be described in each embodiment.

First Embodiment

Figures 15, 16:
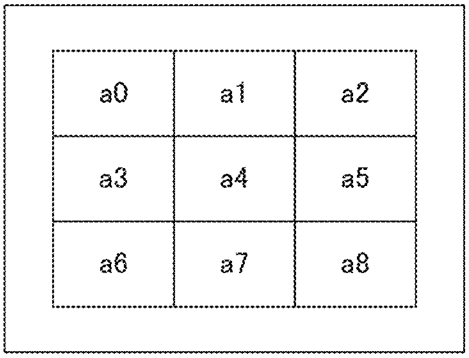
FIG. 15 is a diagram illustrating areas in an image.
FIG. 16 is a table illustrating a coordinate range of each area.
Figure 17:
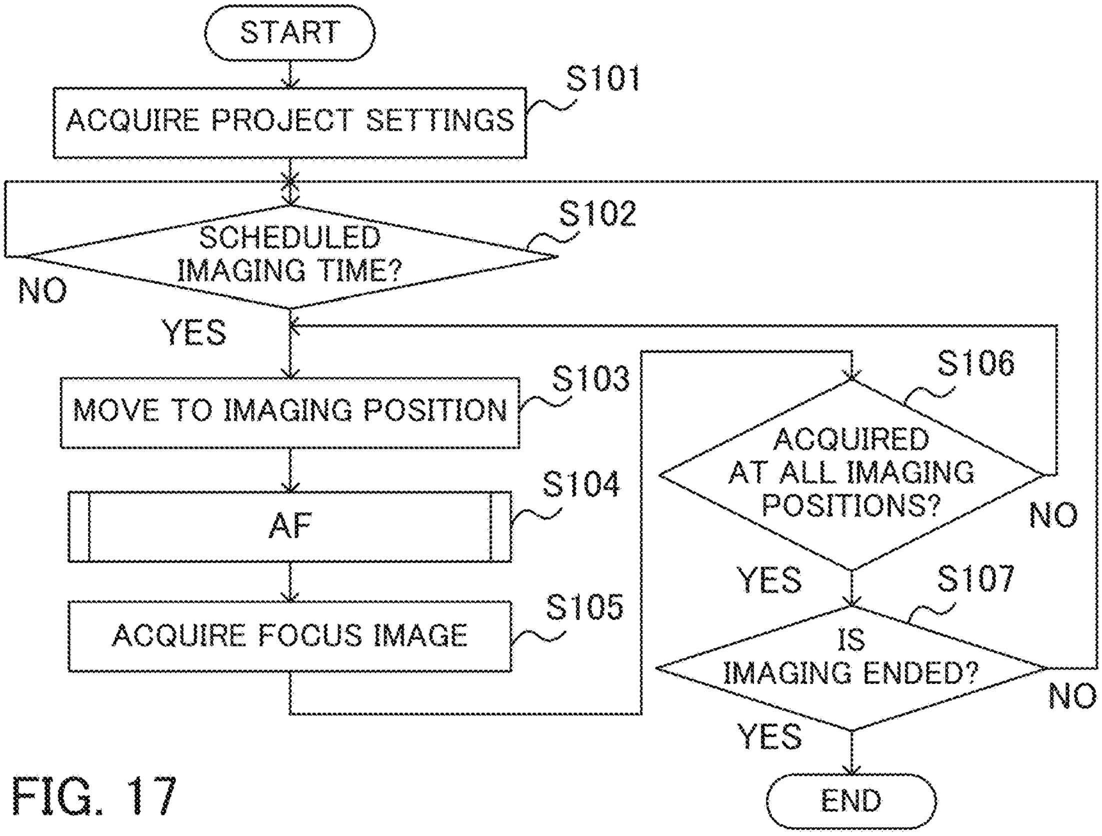
FIG. 17 is a flowchart of processing performed by a system according to a first embodiment.
Figure 18:
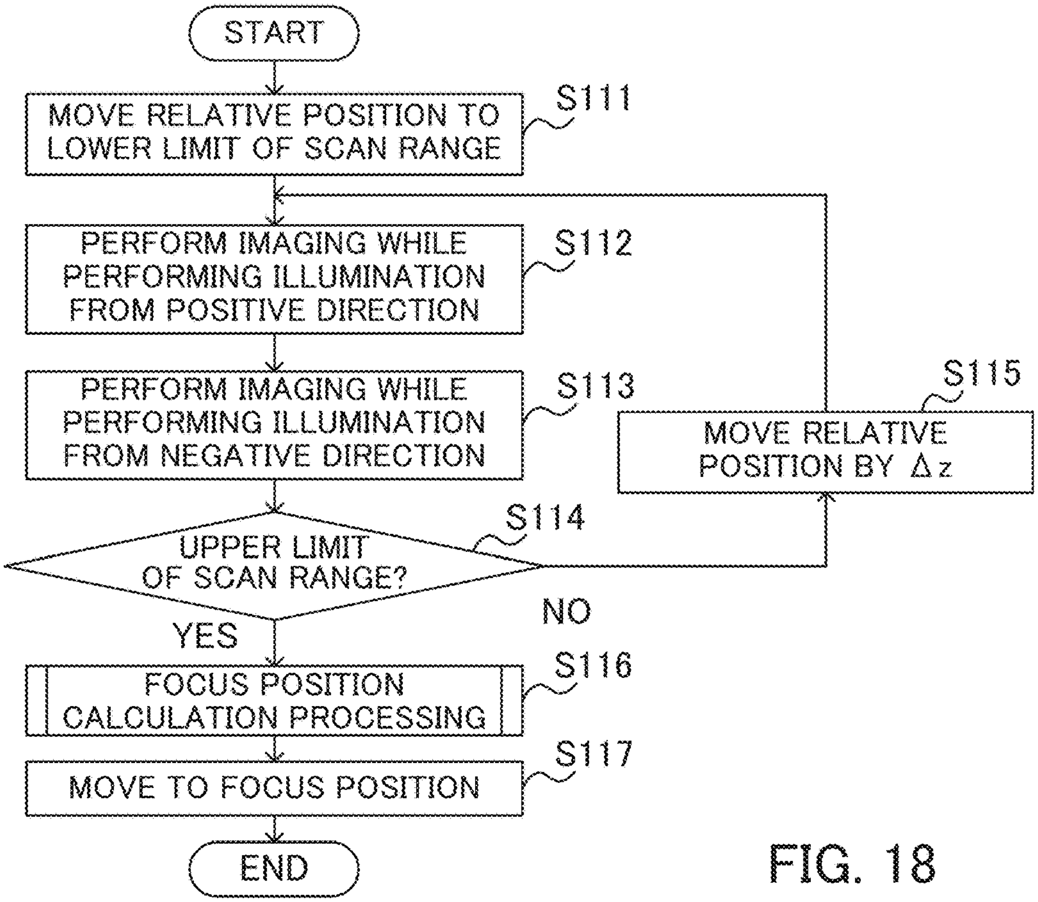
FIG. 18 is a flowchart of autofocus processing illustrated in FIG. 17.
Figure 19:
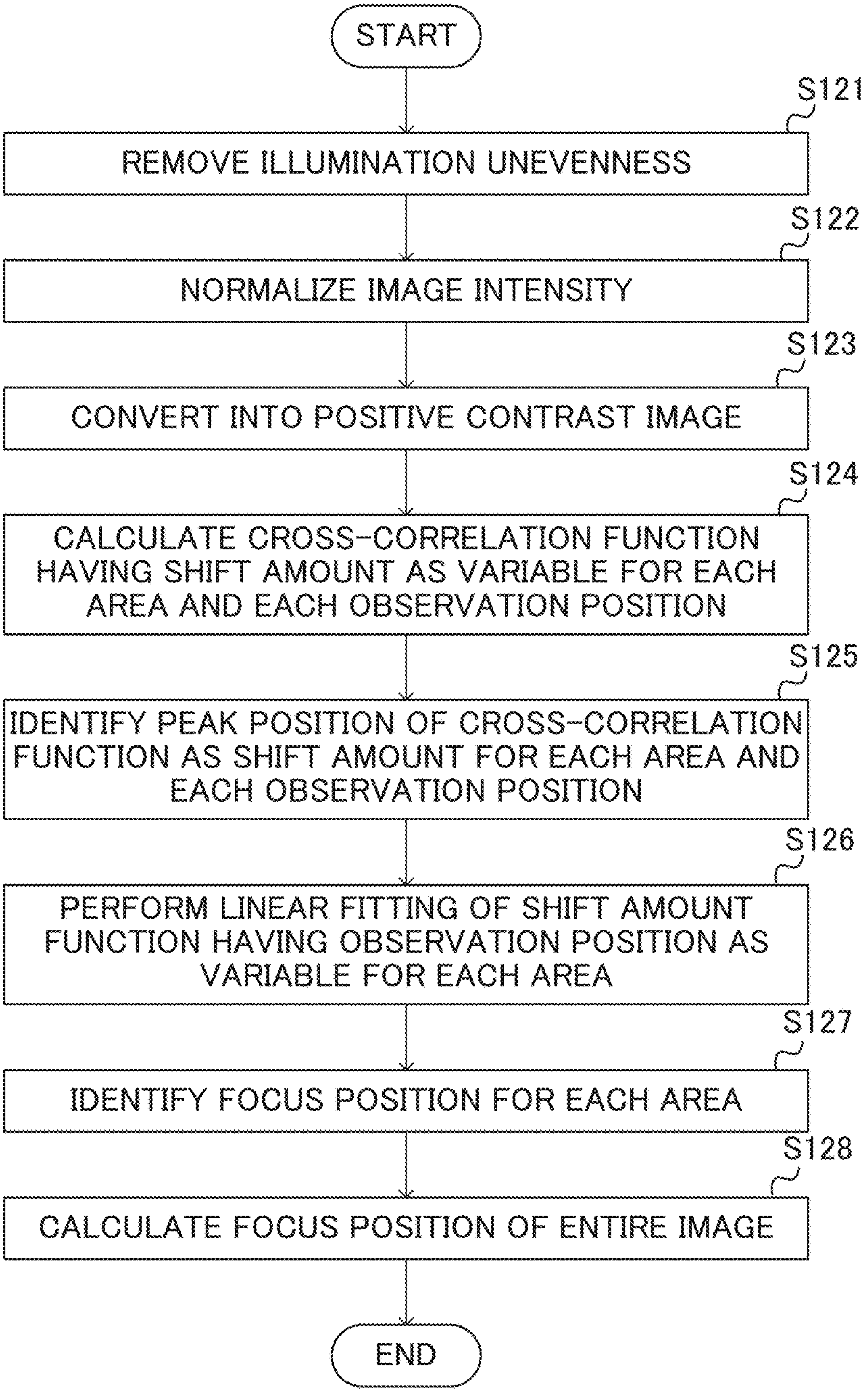
FIG. 19 is a flowchart of focus position calculation processing illustrated in FIG. 18.
Figure 20:
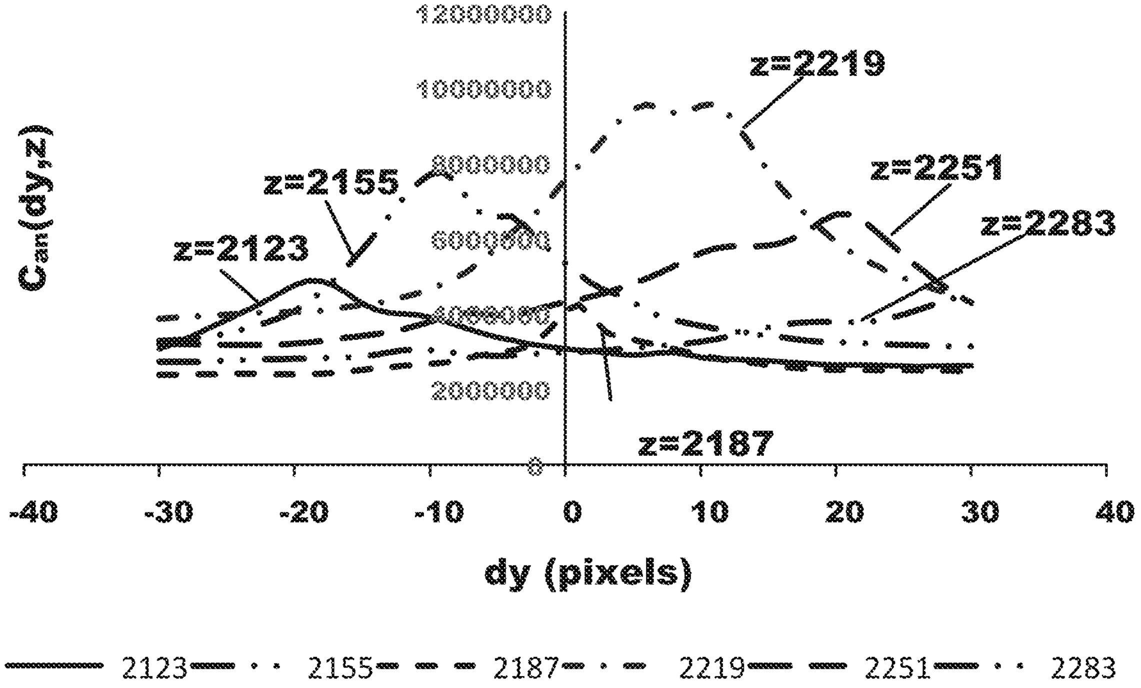
FIG. 20 is a graph illustrating a cross-correlation function at each observation position in a certain area.
Figure 21C:
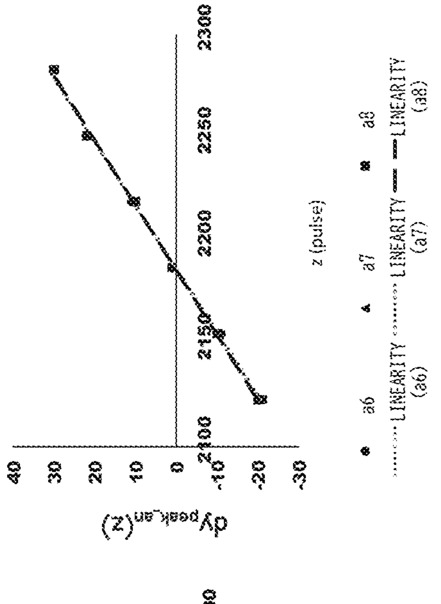
FIGS. 21A to 21C are graphs illustrating a shift amount function in each area.
Figure 21B:
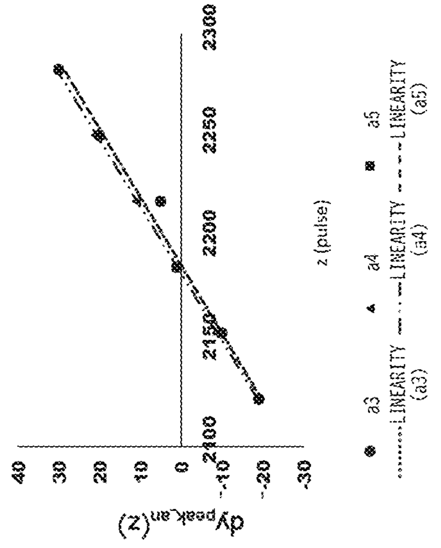
Figure 21A:
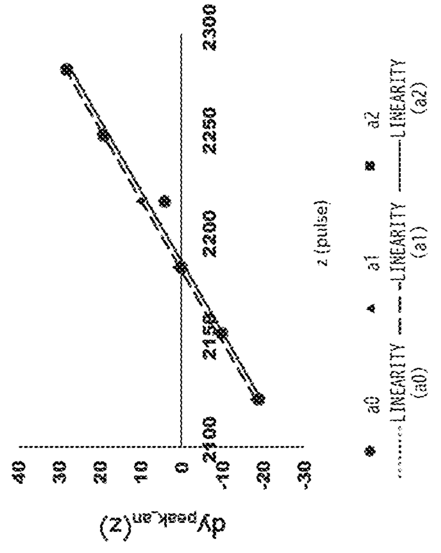

FIG. 15 is a diagram illustrating areas in the image. FIG. 16 is a table illustrating a coordinate range of each area. FIG. 17 is a flowchart of processing performed by a system according to a first embodiment. FIG. 18 is a flowchart of autofocus processing illustrated in FIG. 17. FIG. 19 is a flowchart of focus position calculation processing illustrated in FIG. 18. FIG. 20 is a graph illustrating a cross-correlation function at each observation position in a certain area. FIGS. 21A to 21C are graphs illustrating a shift amount function in each area. FIG. 22 is a table illustrating a slope and focus position in each area calculated from the shift amount function illustrated in FIGS. 21A to 21C, and a focus position of an entire image. Hereinafter, processing performed by the system according to the present embodiment will be described with reference to FIGS. 15 to 22. Note that the system according to the present embodiment has the same configuration as that of the system 1. Thus, the same constituent elements as those of the system 1 are referred to by the same reference numerals.

In the present embodiment, the image is divided into a plurality of areas, and the focus position is calculated for each area. Thereafter, the focus position of the entire image is calculated from the focus position in each area. Note that the number of areas is not particularly limited, but the image may be divided into, for example, a total of nine areas of 3×3 from an area a0 to an area a8, as illustrated in FIG. 15. FIG. 16 illustrates a detailed coordinate range of each area when divided into nine areas. Hereinafter, processing illustrated in FIG. 17 will be specifically described using as an example a case where time-lapse imaging is performed.

The processing illustrated in FIG. 17 is started when the processor 31 executes the program stored in the storage device 32. First, the processor 31 acquires project settings by reading the project settings from the storage device 32 (step S101). The project settings include, for example, various conditions of time-lapse imaging (imaging interval and imaging position coordinates), information on a container to be used (type of container), and the like.

Note that, in step S101, various parameters to be used in autofocus processing to be described later may be acquired in addition to the project settings. The parameters are, for example, Δz, p, M, NA, $dy_{min}$, $dy_{max}$, and the like.

Δz is a movement pitch of the imaging unit 15 in the optical axis direction. The unit of Δz is a drive pulse of the motor of the stage 13, and one drive pulse corresponds to 0.0016 mm. p is a pixel pitch of the imaging element 19. The unit of p is mm. M is a lateral magnification of the observation optical system 18. NA is the numerical aperture on the object side of the observation optical system 18. $dy_{min}$ and $dy_{max}$ are a minimum value and a maximum value of the position shift amount when the correlation function is calculated, respectively, and the unit of $dy_{min}$ and $dy_{max}$ is pixel.

$\Delta z$=32 pulses p=0.0024 mm

M=2.2

NA=0.25

$dy_{min}$=−30 pixels $dy_{max}$=+30 pixels

When the project settings are acquired, the processor 31 waits until the scheduled imaging time (step S102). When the scheduled imaging time comes, the processor 31 controls the observation device 10 to move the imaging unit 15 to the imaging position (step S103). Here, when the stage 13 moves in the xy direction, the imaging unit 15 is moved to the imaging position.

Thereafter, the processor 31 performs autofocus processing (step S104). Details of the autofocus processing will be described later.

When the imaging unit 15 is moved to the focus position by the autofocus processing, the processor 31 controls the observation device 10 to acquire the focus image (step S105).

Furthermore, the processor 31 determines whether the focus image has been acquired at all the imaging positions (step S106). In a case where the focus image has not been acquired at all the imaging positions in the case of the multi-point imaging, the processor 31 repeats the processing from step S103 to step S105 until the focus image is acquired at all the imaging positions.

The processor 31 determines whether or not all scheduled imaging has been ended (step S107). In a case where imaging has not been ended, the processor 31 waits until the next imaging time and repeats the processing from step S102 to step S106. When all the scheduled imaging is ended, the processor 31 ends the processing illustrated in FIG. 17. Thus, an image in focus can be acquired by time-lapse imaging.

The autofocus processing performed in step S104 will be described. When the autofocus processing performed in step S104 is started, the processor 31 specifies the scan range and instructs the observation device 10 to acquire the preliminary image. That is, preliminary image acquisition processing is performed. Thus, the processing from step S111 to step S115 illustrated in FIG. 18 is performed by the observation device 10.

Note that the scan range is determined based on the information on the containers included in the project settings. In this example, the container is identified as a T75 flask from the project settings, so that the processor 31 determines the scan range to be the following range. The lower limit z and the upper limit z, which are the upper and lower limits of the scan range, are represented by the number of drive pulses from the reference position.

Lower limit z of scan range=2123 pulses

Upper limit z of scan range=2283 pulses

First, the observation device 10 controls the stage 13 to move the relative position of the imaging unit 15 to the lower limit z of the scan range (step S111). Thereafter, the observation device 10 controls the imaging unit 15 to image the sample S while controlling the light source unit 14 to illuminate the sample S from the positive direction (step S112). Furthermore, the observation device 10 controls the imaging unit 15 to image the sample S while controlling the light source unit 14 to illuminate the sample S from the negative direction (step S113).

The observation device 10 determines whether the relative position of the imaging unit 15 reaches the upper limit z of the scan range (step S114). In a case where the relative position has not reached the upper limit z of the scan range, the observation device 10 moves to the next observation position by moving the relative position by $\Delta z$ (32 pulses in this example) (step S115), and repeats the processing of steps S112 and S113. The observation device 10 repeats the above processing until the relative position reaches the upper limit z of the scan range.

When the preliminary image acquisition processing is ended, the processor 31 performs the focus position calculation processing illustrated in FIG. 19 based on the preliminary image acquired by the observation device 10 (step S116).

First, the processor 31 removes illumination unevenness of the preliminary image (step S121). In step S121, the processor 31 performs filter processing of cutting a low-frequency component on each of the plurality of images. This filter processing is performed on the entire image region. As a result, the plurality of preliminary images obtained by the imaging (hereinafter, also referred to as a plurality of original images) are converted into a plurality of images from which the illumination unevenness has been removed (hereinafter, referred to as a plurality of filtered images).

Note that, hereinafter, the intensity of each pixel of the original image acquired at the time of positive direction illumination among the plurality of original images is referred to as $I_{o,\ plus}$ (x, y, z), and the intensity of each pixel of the original image acquired at the time of negative direction illumination is referred to as $I_{o,\ minus}$ (x, y, z). The intensity of each pixel of the filtered image obtained by filtering the original image acquired at the time of positive direction illumination among the plurality of filtered images is referred to as $I_{LCF,\ plus}$ (x, y, z), and the intensity of each pixel of the filtered image obtained by filtering the original image acquired at the time of negative direction illumination is referred to as $I_{LCF,\ minus}$(x, y, z). x is the row number of the pixel, y is the column number of the pixel, and z is the observation position.

Next, the processor 31 normalizes the image intensity (step S122). In step S122, the processor 31 normalizes and converts the plurality of filtered images into a plurality of normalized images having the equal average intensity. Specifically, for example, the processor 31 is required to generate the plurality of normalized images so that each pixel of the plurality of normalized images has intensity calculated by the following expression.

$$I_{nml,plus}(x,y,z) = \left(\frac{n \cdot I_{ave}}{\sum_{x,y} I_{LFC,plus}(x,y,z)}\right) I_{LFC,plus}(x,y,z) \tag{1}$$

$$I_{nml,minus}(x,y,z) = \left(\frac{n \cdot I_{ave}}{\sum_{x,y} I_{LFC,minus}(x,y,z)}\right) I_{LFC,minus}(x,y,z) \tag{2}$$

Here, $I_{nml,plus}$ (x, y, z) represents the intensity of each pixel of the normalized image corresponding to the positive direction illumination among the plurality of normalized images, and $I_{nml,\ minus}$ (x, y, z) represents the intensity of each pixel of the normalized image corresponding to the negative direction illumination among the plurality of normalized images. $I_{ave}$ represents the average pixel intensity of the plurality of normalized images. n represents the number of pixels of the filtered image.

Furthermore, the processor 31 converts the normalized image into a positive contrast image (step S123). In step S123, the processor 31 performs the following calculation to generate the positive contrast image.

$$I_{pc,plus}(x, y, z) = U|I_{nml,plus}(x, y, z) - I_{ave}| \quad (3)$$

$$I_{pc,minus}(x, y, z) = U|I_{nml,minus}(x, y, z) - I_{ave}| \quad (4)$$

Here, $I_{pc,\ plus}$ (x, y, z) represents the intensity of each pixel of the positive contrast image generated from the normalized image corresponding to the positive direction illumination. $I_{pc,minus}$ (x, y, z) represents the intensity of each pixel of the positive contrast image generated from the normalized image corresponding to the negative direction illumination. U represents a contrast adjustment value.

When the positive contrast image is generated, the processor 31 calculates the cross-correlation function for each area and each observation position (step S124). Here, the processor 31 calculates the cross-correlation function from a set of the positive contrast images generated from a set of the preliminary images constituting each image group. More specifically, the image is divided into the above-described nine areas, and the cross-correlation function is calculated for each area using the following expression.

$$C_{an}(dy, z) = \sum_{x_{an\_min}}^{x_{an\_max}} \sum_{y_{an\_min}}^{y_{an\_max}} \{I_{pc,plus}(x, y, z) \cdot I_{pc,minus}(x, y - dy, z)\} \quad (5)$$

Here, an represents the area number. dy represents the shift amount. $C_{an}$ (dy, z) is a cross-correlation function having the shift amount dy and the observation position z as variables. $x_{an\_min}$, $x_{an\_max}$, $y_{an\_min}$, and $y_{an\_max}$ represent the minimum x coordinate, the maximum x coordinate, the minimum y coordinate, and the maximum y coordinate, respectively, of the area with the area number n.

As a result, as illustrated in FIG. 20, the cross-correlation function is calculated for each area and each observation position. Note that FIG. 20 illustrates only the cross-correlation function for each observation position in a predetermined area (for example, a4). When the cross-correlation function is calculated, the processor 31 specifies the peak position of the cross-correlation function as the shift amount $dy_{peak}$ for each area and each observation position (step S125).

Thereafter, the processor 31 performs, for each area, linear fitting of the shift amount function having the observation position as a variable (step S126). Here, the processor 31 linearly fits, for each area, the plurality of shift amounts $dy_{peak}$ having different observation positions calculated for the same area by a least squares method to calculate a shift amount function $dy_{peak\_an}$ (z). As a result, a slope k of the shift amount function is also calculated together with the shift amount function in each area. The slope k of the shift amount function in each area is, for example, as illustrated in FIG. 22.

Assuming that the shift amount $dy_{peak}$ is proportional to the distance from the focus position to the observation position and is zero at the focus position, the shift amount function $dy_{peak\_a}$ (z) is represented by the following expression. Here, $z_{best\_an}$ is the focus position of the area with the area number n. k is the slope of the shift amount function.

$$dy_{peak\_an}(z) = k\{z - z_{best\_an}\} \quad (6)$$

In step S126, the slope k of the shift amount function is calculated by fitting, but the slope k is theoretically represented by the following expression. However, K is a value depending on the illumination state, and 0<|K|<1. In particular, 0.2<|K|<0.9 in the case of oblique illumination. In this container, K is within the range of 0.4 to 0.5.

$$k = \frac{2K \cdot M \cdot NA}{p} \quad (7)$$

FIGS. 21A to 21C illustrate the shift amount function calculated in step S126. FIG. 21A illustrates three shift amount functions corresponding to the areas a0 to a2, FIG. 21B illustrates three shift amount functions corresponding to the areas a3 to a5, and FIG. 21C illustrates three shift amount functions corresponding to the areas a6 to a8.

When the shift amount function is calculated for each area, the processor 31 identifies the focus position for each area (step S127). Here, the processor 31 estimates a relative position where the shift amount is zero, that is, the z-intercept of the shift amount function as the focus position, and identifies the focus position in each area. The focus position in each area is, for example, as illustrated in FIG. 22.

When the focus position is identified for each area, the processor 31 calculates the focus position of the entire image (step S128). Here, the processor 31 calculates the average of the focus positions in each area as the focus position of the entire image. In this example, as illustrated in FIG. 22, the focus position of the entire image is calculated as z=2187 pulses.

When the focus position of the entire image is calculated and the focus position calculation processing illustrated in FIG. 22 is completed, the processor 31 controls the observation device 10 to move the observation device 10 to the calculated focus position (step S117), and ends the autofocus processing illustrated in FIG. 18.

As described above, in the system according to the present embodiment, the focus position can be accurately calculated without preparing detailed parameter information in advance, as in the system 1. In addition, since the focus position is calculated based on the shift amount instead of the contrast level, the focus position can be calculated even in the environment where a plurality of contrast peaks can be formed, as in the system 1. Furthermore, in the system according to the present embodiment, since the focus position is calculated for each area and then the focus position of the entire image is calculated, the focus position can be determined satisfactorily even for the sample S having a great variation in height in the optical axis direction.

Note that it is desirable to satisfy the following expressions in the autofocus processing and the system according to the present embodiment satisfies all of these expressions.

$$\frac{p}{2K \cdot M \cdot NA} < \Delta z < \frac{(dy_{max} - dy_{min})p}{4K \cdot M \cdot NA} \quad (8)$$

$$10 < (dy_{max} - dy_{min}) < 200 \quad (9)$$

Expression (8) represents a desirable range as the movement pitch Δz of the imaging unit 15 in the optical axis direction in the autofocus processing. When Δz is equal to or less than the lower limit (=1/k) of Expression (8), the image displacement caused by the movement of the imaging unit 15 is less than one pixel, and thus the image displacement may not be correctly reflected in the shift amount. As a result, there is a risk that the fitting accuracy decreases and the accuracy of the focus position decreases, which is not desirable. In addition, when Δz is equal to or greater than the upper limit of Expression (8), a plurality of observation positions cannot be provided within the scan range. Thus, it is impossible to perform fitting and it is difficult to calculate the focus position.

Expression (9) represents a desirable range as a difference between the maximum value and the minimum value of the position shift amount when the correlation function is calculated. When the difference is equal to or less than the lower limit of Expression (9), a possibility that the correlation function including the peak position is not calculated increases. In addition, when the difference is equal to or greater than the upper limit of Expression (9), the amount of calculations required to calculate the correlation function increases, resulting in a longer time for the autofocus processing.

Second Embodiment

Figure 23:
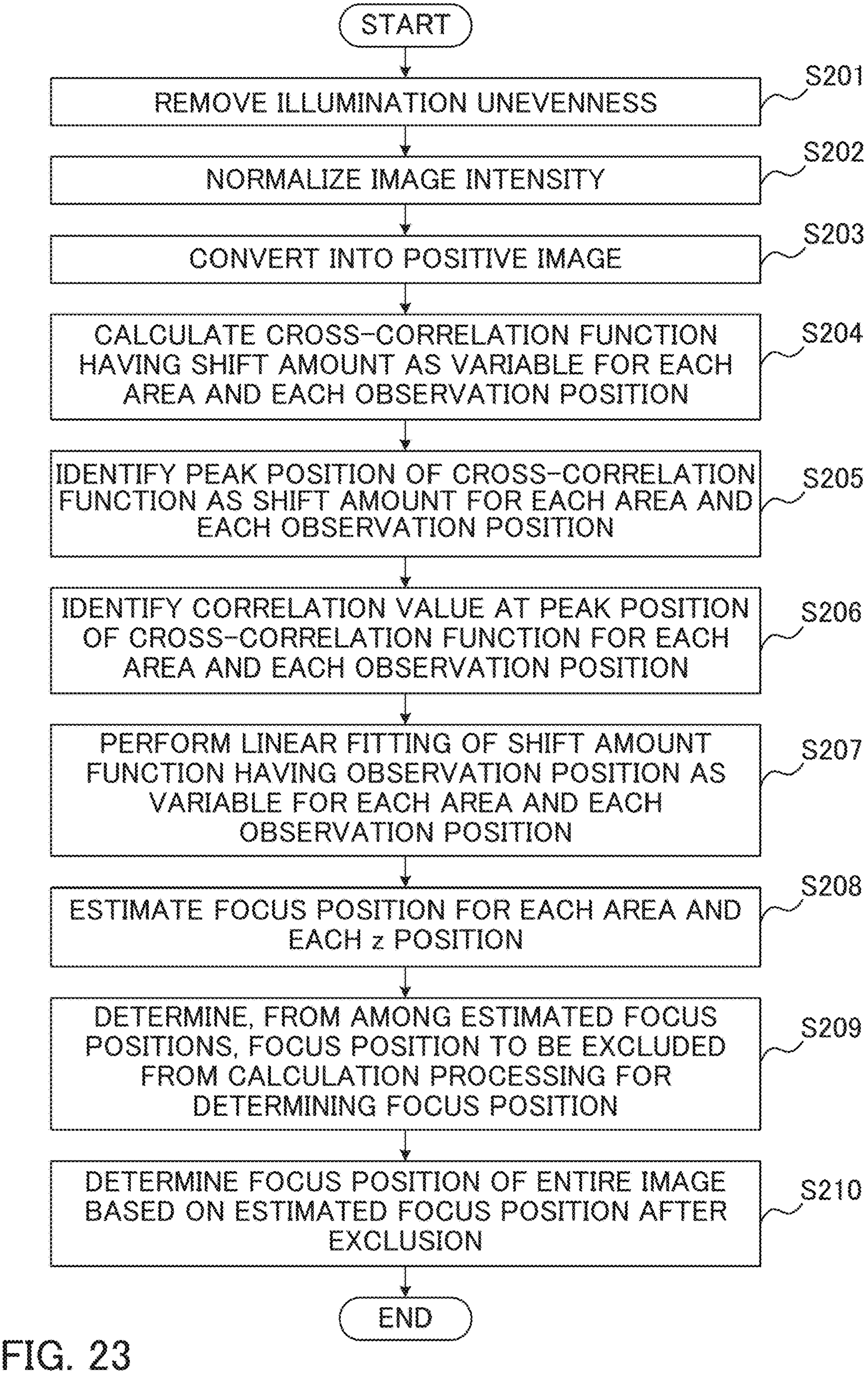
FIG. 23 is a flowchart of focus position calculation processing performed by a system according to a second embodiment.
Figure 24A:
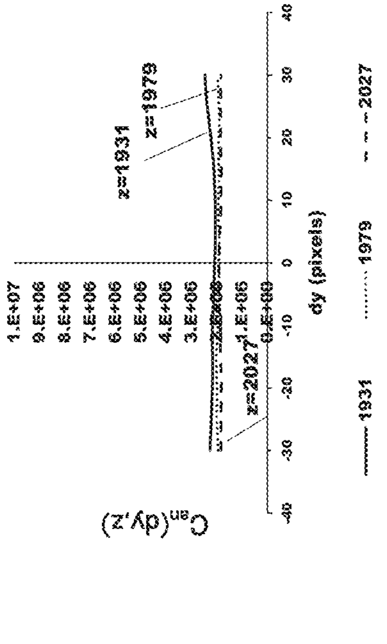
FIGS. 24A to 24C are graphs illustrating a cross-correlation function at each observation position in a certain area.
Figure 24B:
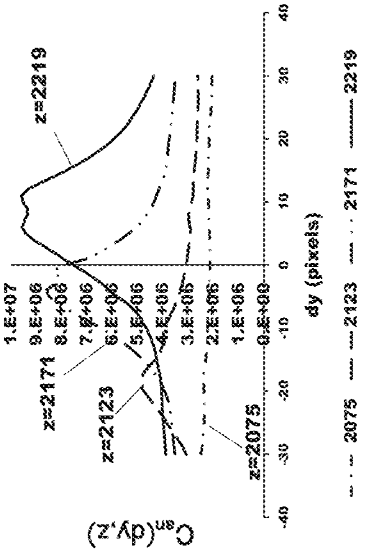
Figure 24C:
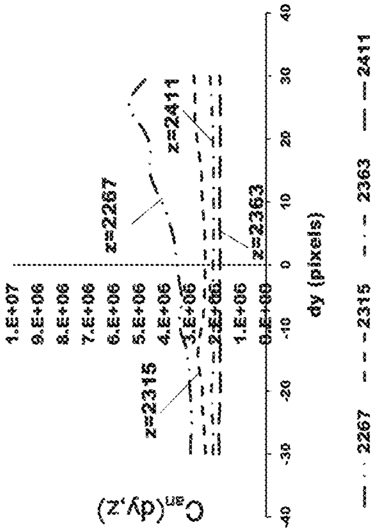
Figure 25:
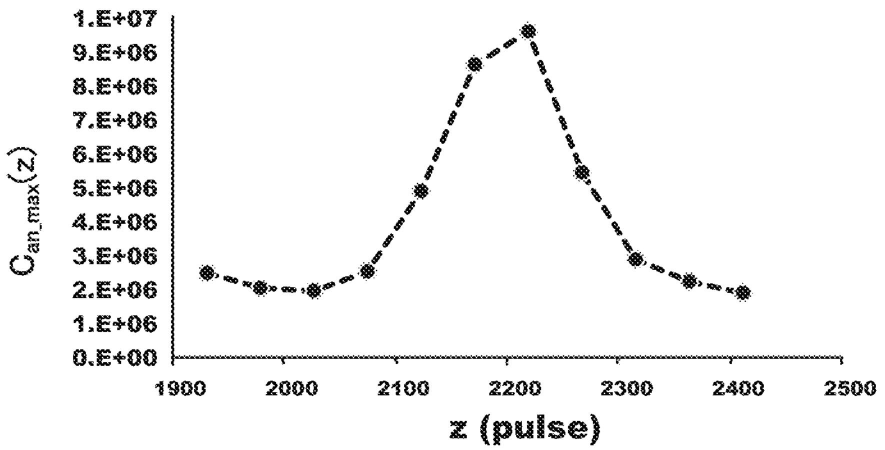
FIG. 25 is a graph illustrating a cross-correlation peak function in the certain area.
Figure 26:
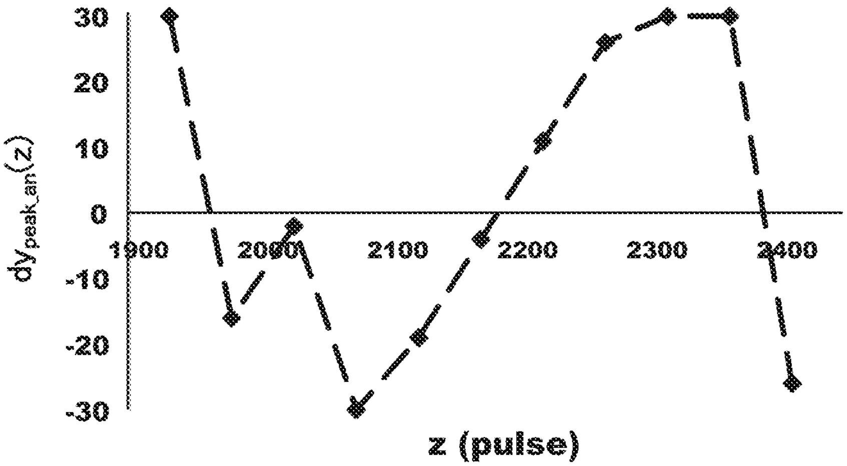
FIG. 26 is a graph illustrating a shift amount function in the certain area.
Figure 27:
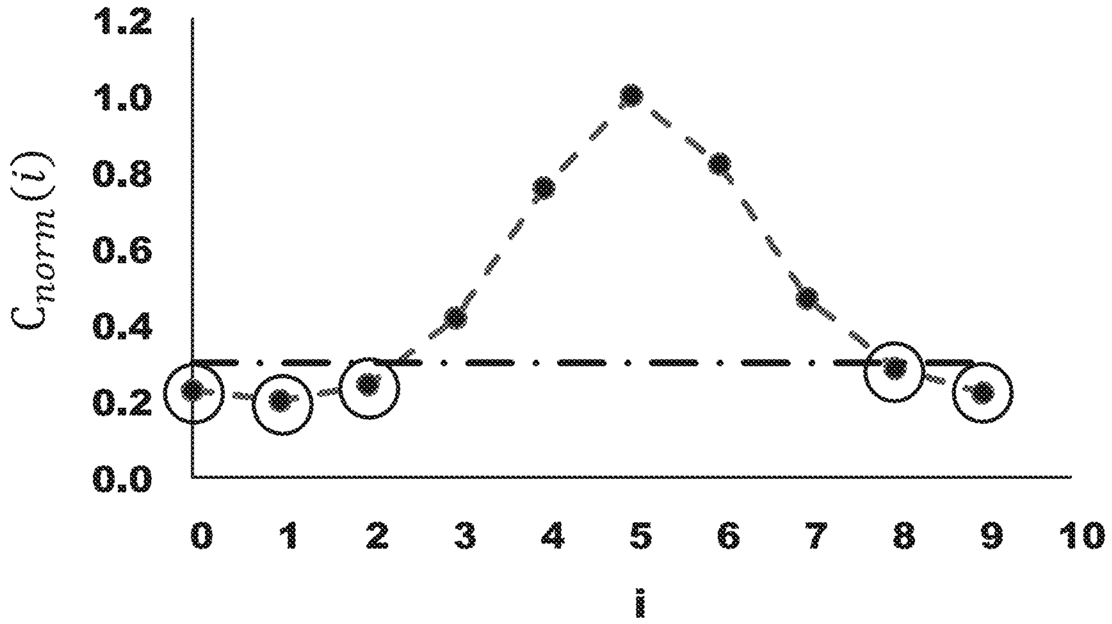
FIG. 27 is a diagram for describing a method of determining excluded data using a cross-correlation peak function value.
Figure 28:
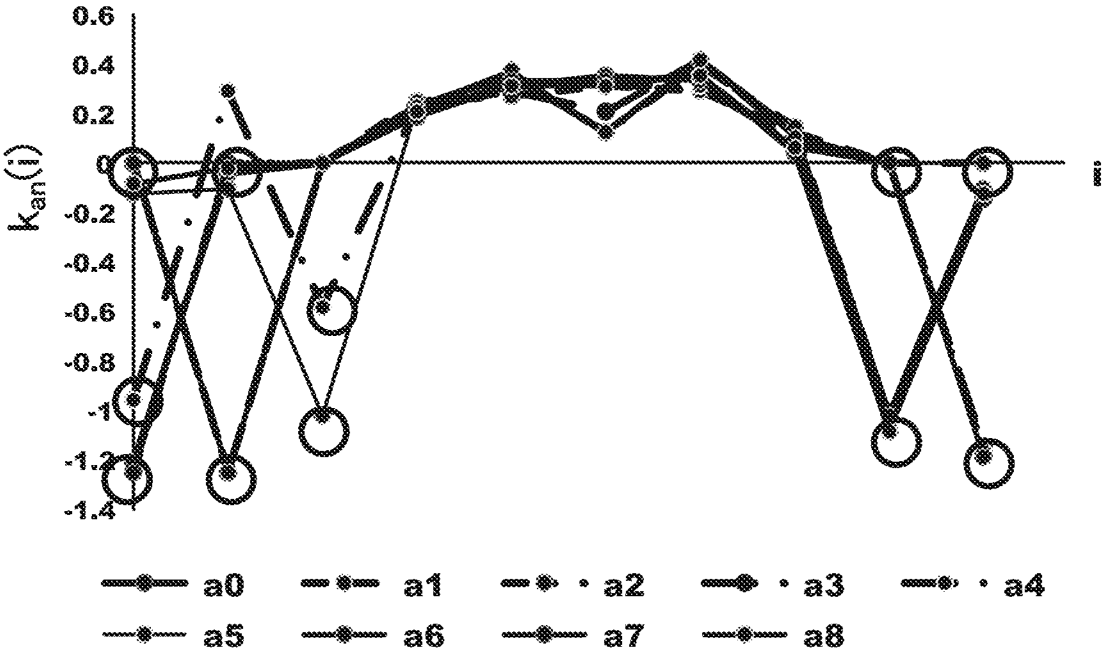
FIG. 28 is a diagram for describing a method of determining the excluded data using a slope of the shift amount function.
Figure 29:
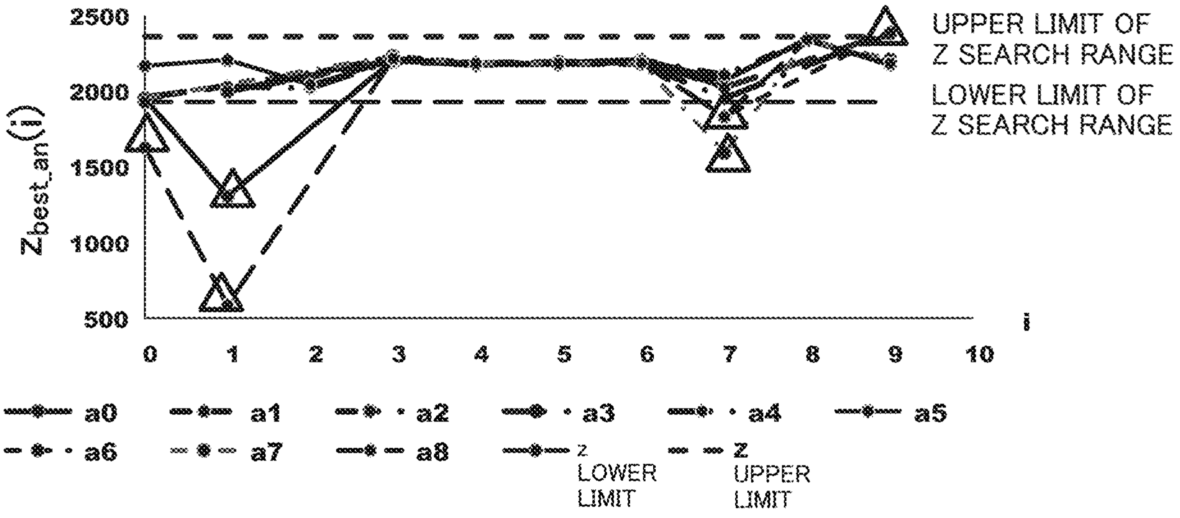
FIG. 29 is a diagram for describing a method of determining the excluded data using a Z search range.
Figure 30:
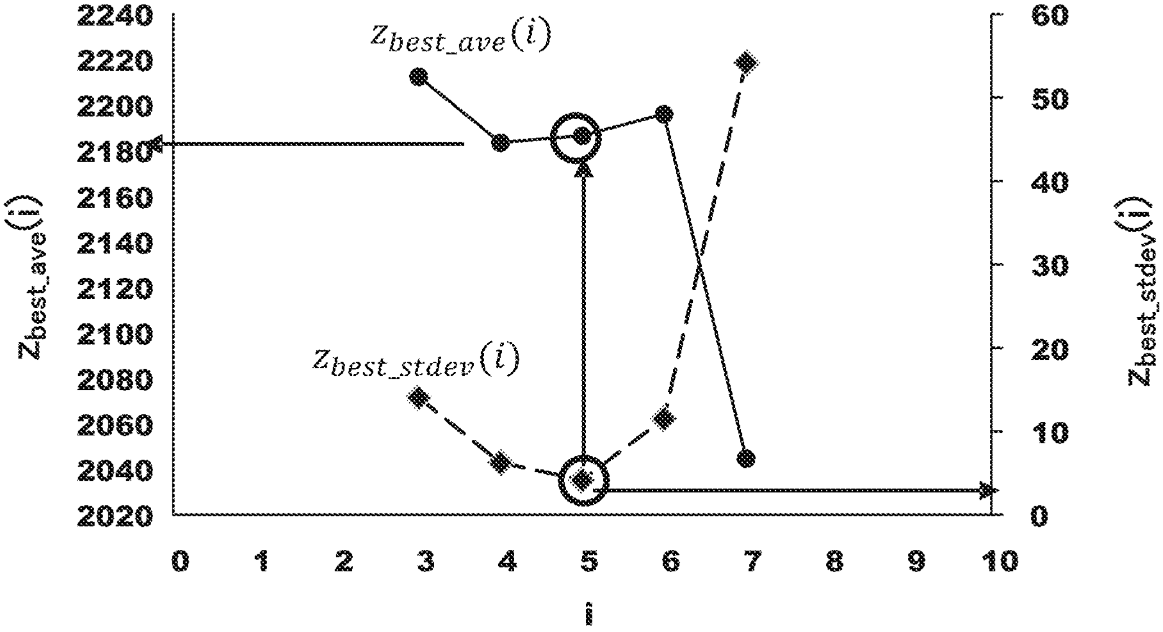
FIG. 30 is a diagram for describing a method of determining the focus position of the entire image based on the focus position calculated for each area and each observation position.

FIG. 23 is a flowchart of focus position calculation processing performed by a system according to a second embodiment. FIGS. 24A to 24C are graphs illustrating a cross-correlation function at each observation position in a certain area. FIG. 25 is a graph illustrating a cross-correlation peak function in the certain area. FIG. 26 is a graph illustrating a shift amount function in the certain area. FIG. 27 is a diagram for describing a method of determining excluded data using a cross-correlation peak function value. FIG. 28 is a diagram for describing a method of determining the excluded data using the slope of the shift amount function. FIG. 29 is a diagram for describing a method of determining the excluded data using a Z search range. FIG. 30 is a diagram for describing a method of determining the focus position of the entire image based on the focus position calculated for each area and each observation position. Hereinafter, processing performed by the system according to the present embodiment will be described with reference to FIGS. 23 to 30.

The container used in the present embodiment is the same as the container in the first embodiment, and K is within the range of 0.4 to 0.5. The system according to the present embodiment has the same configuration as that of the system according to the first embodiment. However, the system is different from the system according to the first embodiment in that the focus position calculation processing illustrated in FIG. 23 is performed instead of the focus position calculation processing illustrated in FIG. 19. Note that the focus position calculation processing illustrated in FIG. 23 is suitable in a case where a wide scan range needs to be set, such as a case where the sample has a particularly great variation in height.

Among the parameters used in the present embodiment, parameters having different values from those used in the first embodiment are as follows. A wider scan range than that of the first embodiment is set, and a greater Δz than that of the first embodiment is set to suppress an increase in the number of sheets of images acquired in the autofocus processing.

Δz=48 pulses

Lower limit z of scan range=1931 pulses

Upper limit z of scan range=2411 pulses

Hereinafter, the focus position calculation processing illustrated in FIG. 23 will be specifically described. Note that the processing from step S201 to step S205 is the same as the processing from step S121 to step S125 in FIG. 19.

FIGS. 24A to 24C illustrate the cross-correlation function calculated for the area a4. FIG. 24A illustrates the cross-correlation function at an observation position close to the lower limit of the scan range, FIG. 24B illustrates the cross-correlation function at an observation position near the center of the scan range, and FIG. 24C illustrates the cross-correlation function at an observation position close to the upper limit of the scan range.

In a case where a wide scan range is set, a preliminary image acquired at an observation position significantly far from the focus position is included in the plurality of preliminary images used in the focus position calculation processing. In such an image, since the shift amount between the images is great, the peak of the correlation function appears outside the range of the maximum value and the minimum value of the position shift amount, and as a result, there is a possibility that a true peak does not appear in the calculated correlation function and an erroneous shift amount is calculated. The correlation function illustrated in FIGS. 24A and 24C corresponds to this case. In addition, even if the shift amount between the images falls within the range between the maximum value and the minimum value of the position shift amount, a clear peak may not appear in the correlation function due to strong image blurring. Also in this case, the shift amount between the images is not correctly calculated.

Thus, in a case where the scan range is wide, the shift amount between the images calculated for each observation position may include an incorrect value. Therefore, in the present embodiment, the focus position is calculated after excluding information attributed to such an incorrect shift amount from the calculation processing to prevent such information from being used in the calculation of the focus position.

To distinguish the incorrect shift amount, in the present embodiment, the processor 31 identifies the correlation value at the peak position for each area and each observation position (step S206). That is, the processor 31 calculates the correlation value at the peak position together with the peak position (shift amount), and calculates the focus position based on the shift amounts and the correlation values at a plurality of peak positions in the subsequent steps. Note that FIG. 25 illustrates a cross-correlation peak function $C_{an\_max}$ (z) in a certain area (for example, the area a4) using the correlation value at the peak position calculated in step S206.

Thereafter, the processor 31 performs fitting of the shift amount function and the estimation of the focus position that are performed for each area in the first embodiment, for each area and each observation position (step S207, step S208). This is because, when the fitting and the estimation of the focus position are performed for each area, information of the observation position significantly far from the focus position is inevitably included in the calculation for each area, thus decreasing the accuracy. On the other hand, when the fitting and the estimation of the focus position are performed for each area and each observation position, it is possible to separate the calculation using the information of the observation position significantly far from the focus position and the calculation not using such information. As a result, the focus position can be accurately calculated by selecting only the calculation result not using the information of the observation position significantly far from the focus position and using such a calculation result in the calculation of the focus position.

Specifically, the processor 31 performs linear fitting from two pieces of information, the shift amount at the observation position of interest and the shift amount at another observation position adjacent to the observation position of interest (step S207). That is, the shift amount function is calculated by connecting the two points with a straight line. Furthermore, the processor 31 estimates the observation position where the shift amount is zero as the focus position for each shift amount function calculated by connecting the two points (step S208). FIG. 26 is a diagram illustrated by connecting a plurality of shift amount functions calculated for each observation position in a certain area (for example, the area a4) in step S207.

When the focus positions are estimated in step S208, the processor 31 determines, from among the plurality of estimated focus positions, a focus position to be excluded from the calculation processing for determining a true focus position (step S209). The focus position to be excluded is determined using three determination criteria.

The first criterion uses the cross-correlation peak function value (correlation value). It is assumed that the observation position where the correlation value is small at the peak position is significantly far from the focus position. Based this assumption, unnecessary information can be distinguished.

The processor 31 calculates, for each area, an average value $C_{an\_max}$ (i) of a correlation value $C_{an\_max}$ $(z_i)$ at the peak position of the correlation function calculated for an observation position $z_i$ of interest and a correlation value $C_{an\_max}$ $(z_{i+1})$ at the peak position of the correlation function calculated for an observation position $z_{i+1}$ adjacent to the observation position $z_i$ of interest. Note that i indicates the observation position of interest (hereinafter simply referred to as a position of interest).

Furthermore, the processor 31 further averages the average value $C_{an\_max}$ (i) of the plurality of different areas calculated by focusing on the same observation position, using the following expression to calculate a new average value $C_{ave}$ (i).

$$C_{ave}(i) = \frac{\sum_{a_n} C_{an\_max}(i)}{n} \tag{14}$$

Thereafter, the processor 31 calculates an average value for all the positions of interest i while shifting the position of interest i in the scan range. When all the average values are calculated, the average value of the position of interest is normalized by the following expression so that the maximum average value is 1. $C_{norm}$ (i) is a normalized average value.

$$C_{norm}(i) = \frac{C_{ave}(i)}{\max(C_{ave}(i))} \tag{15}$$

The processor 31 excludes the position of interest where the normalized average value is equal to or less than a threshold from the focus position. In other words, the processor 31 excludes information corresponding to the position of interest (observation position) where the correlation value at the correlation peak is below the threshold from the calculation processing for calculating the focus position to be performed thereafter. The threshold is, for example, 0.3. FIG. 27 illustrates a state in which the positions of interest to be excluded from the focus position have been selected using a threshold of 0.3. In this example, five points of the positions of interest i=0, 1, 2, 8, and 9 are excluded.

The second criterion uses the slope of the shift amount function. Since the direction in which the subject is shifted in the image is determined by the direction in which the observation position is shifted from the focus position (that is, the direction in which the focal plane is shifted from the sample plane), the positive and negative of the slope of the shift amount function is known in advance. In a case where the slope of the shift amount function has a sign opposite to the assumed one, it can be considered that a correct shift amount is not calculated at the observation position. Therefore, unnecessary information can be distinguished based on the slope of the shift amount function.

The processor 31 calculates the slope of the shift amount function for each position of interest and each area using the following expression. $k_{an}$ (i) is the slope of the shift amount function at the position of interest i in the n-th area an.

$$k_{an}(i) = \frac{dy_{peak\_an}(z_{i+1}) - dy_{peak\_an}(z_i)}{z_{i+1} - z_i} \tag{16}$$

The processor 31 excludes the combination of the area and the position of interest where the slope of the shift amount function is a predetermined sign from the focus position. The predetermined sign is minus in this example. FIG. 28 illustrates a state in which the combination of the position of interest and the area to be excluded from the focus position has been selected. In this example, combinations of the position of interest and the area (i, n)=(0,8), (1,0), (1,8), (2,0), (2,1), (2,2), (2,3), (2,6), (2,7), (2,8), (7,6), (7,7), (9,3), (9,4), and (9,6) are excluded.

The third criterion uses the scan range (Z search range). The scan range is set on the assumption that the focus position is present within the scan range. In a case where the focus position estimated in step S208 is outside the scan range, there is a high possibility that the focus position has been erroneously estimated. Therefore, unnecessary information can be distinguished based on whether or not the estimated focus position is within the scan range.

The focus position calculated in step S208 is the z-intercept of the shift amount function and is thus represented by the following expression. $Z_{best\_an}$ (i) is the focus position estimated at the position of interest i in the area an.

$$z_{best\_an}(i) = \frac{z_i \cdot dy_{peak\_an}(z_{i+1}) - z_{i+1} \cdot dy_{peak\_an}(z_i)}{dy_{peak\_an}(z_{i+1}) - dy_{peak\_an}(z_i)} \tag{17}$$

The processor 31 excludes the combination of the area and the position of interest where the estimated focus position is outside the scan range from the focus position. In this example, the scan range is 1931 to 2411 pulses. FIG. 29 illustrates a state in which the combination of the position of interest and the area to be excluded from the focus position has been selected. In this example, combinations of the position of interest and the area (i, n)=(0,0) to (0,8), (1,0) to (1,3), (1,5) to (1,8), (2,0) to (2,8), (8,0) to (8,8), and (9,0) to (9,8) are excluded.

When the inappropriate focus positions are excluded from the estimated focus positions, the processor 31 determines the focus position of the entire image based on the estimated focus positions remaining after the exclusion (step S210).

In step S210, the processor 31 first calculates the average and the standard deviation of the focus positions in the plurality of areas estimated for the same position of interest (observation position) using the following expressions. Here, $n_{eff}$ is the number of areas remaining after the exclusion, and may be different in each position of interest. $z_{best\_ave}$ (i) is the average focus position estimated for the position of interest i. $z_{best\_stdev}$ (i) is the standard deviation of the focus position estimated for the position of interest i.

$$z_{best\_ave}(i) = \frac{\sum_{n_{eff}} z_{best\_an}(i)}{n_{eff}} \quad (18)$$

$$z_{best\_stdev}(i) = \frac{\sqrt{\sum_{n_{eff}} \left\{ z_{best\_an}(i) - z_{best\_ave}(i) \right\}^2}}{(n_{eff} - 1)} \quad (19)$$

FIG. 30 illustrates the average focus position and the standard deviation of the focus position calculated in step S210. When the average focus position and the standard deviation of the focus position are calculated, the processor 31 determines the average focus position of the position of interest where the standard deviation is the minimum as the focus position of the entire image. Note that the reason for identifying the position of interest where the standard deviation is the minimum is that the difference between the focus positions estimated for each area is small at the position of interest where the standard deviation is the minimum, which means that there are few errors due to various factors that become remarkable as the position of interest goes farther from the focus position.

As described above, also in the system according to the present embodiment, the focus position can be accurately calculated without preparing detailed parameter information in advance, and the focus position can be calculated even in the environment where a plurality of contrast peaks can be formed, as in the system according to the first embodiment. Furthermore, in the system according to the present embodiment, a correct focus position can be accurately calculated even in a case where a wider scan range needs to be set.

Third Embodiment

Figure 31:
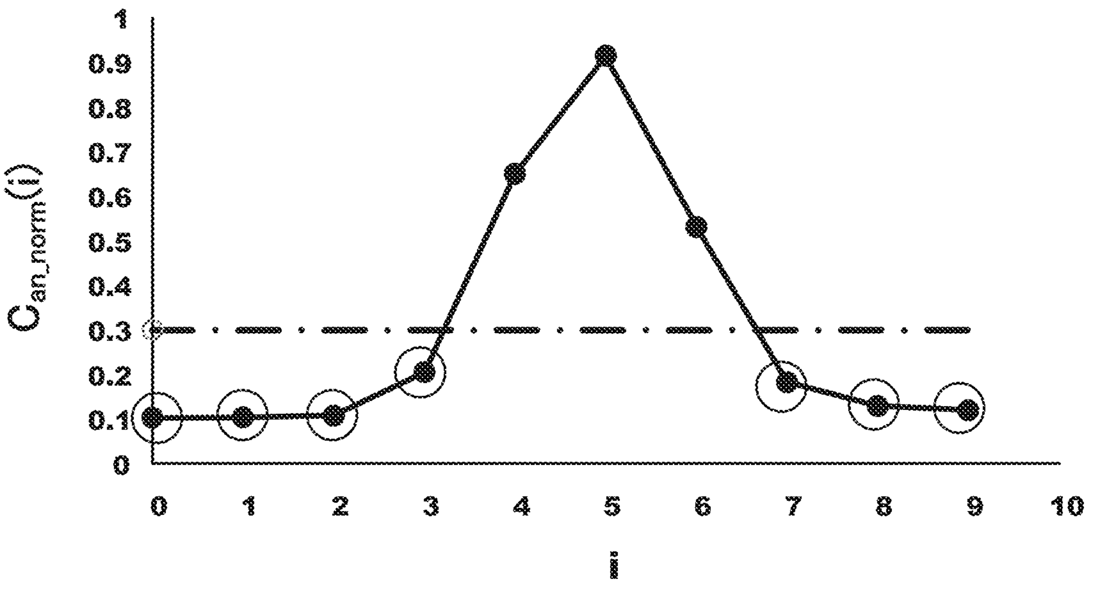
FIG. 31 is a diagram for describing a method of determining the excluded data using the cross-correlation peak function value.
Figure 32:
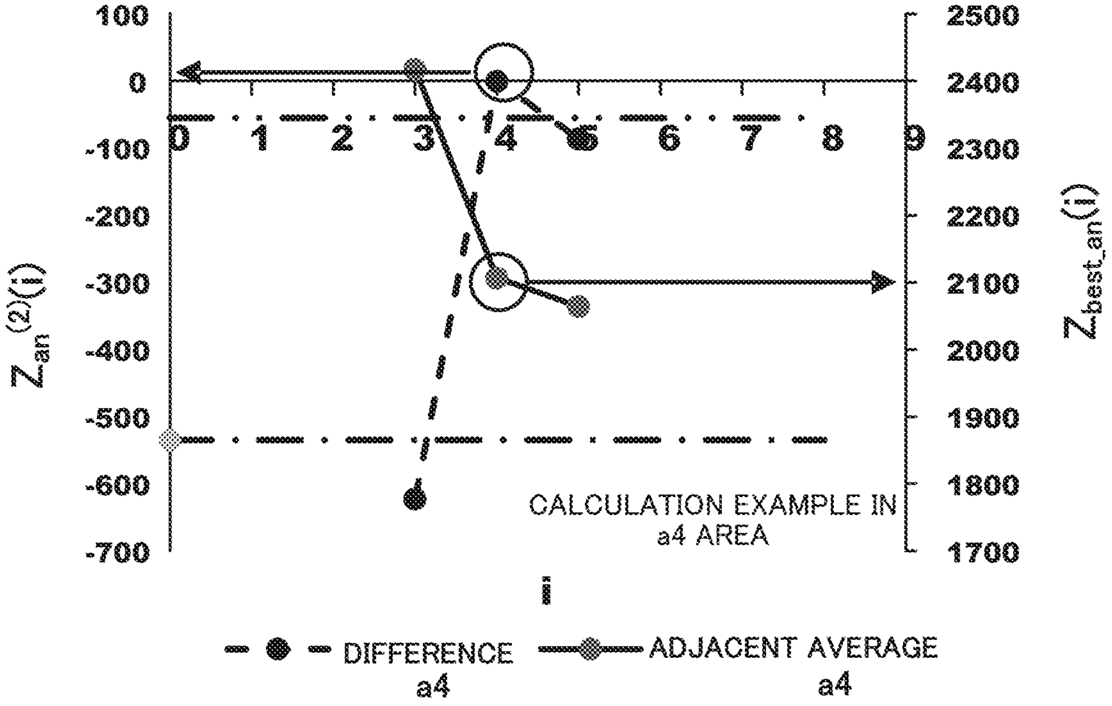
FIG. 32 is a diagram for describing a method of determining the focus position of the entire image based on the focus position calculated for each area and each observation position.

FIG. 31 is a diagram for describing a method of determining the excluded data using the cross-correlation peak function value. FIG. 32 is a diagram for describing a method of determining the focus position of the entire image based on the focus position calculated for each area and each observation position. Hereinafter, processing performed by the system according to the present embodiment will be described with reference to FIGS. 31 and 32.

The system according to the present embodiment has the same configuration as the system according to the second embodiment described above, and furthermore, is the same as the system according to the second embodiment in that the focus position calculation processing illustrated in FIG. 23 is performed. However, the system according to the present embodiment is different from the system according to the second embodiment in the processing of determining information to be excluded performed in step S209 in FIG. 23 and the processing of determining the focus position of the entire image performed in step S210 in FIG. 23 in the focus position calculation processing. The focus position calculation processing performed by the system according to the present embodiment is particularly suitable in a case where the subject is locally distributed in the image, for example, in a case where only one cell is observed.

The container used in the present embodiment is, for example, a T25 flask, different from the container in the second embodiment. In this container, K is within the range of 0.6 to 0.8. In addition, among the parameters used in the present embodiment, parameters having different values from those used in the second embodiment are as follows.

Lower limit z of scan range=1865 pulses

Upper limit z of scan range=2345 pulses

Also in the present embodiment, in step S209, the processor 31 determines the focus positions to be excluded using three determination criteria. Two of them use the slope of the shift amount function and the scan range, which are the same as the second and third determination criteria of the second embodiment, and thus the description thereof will be omitted.

The remaining one criterion uses the cross-correlation peak function value (correlation value), and this criterion is similar to the first criterion of the second embodiment. Specifically, the processor 31 first calculates, for each area, the average value $C_{an\_max}$ (i) of the correlation value $C_{an\_max}$ ($z_i$) at the peak position of the correlation function calculated for the observation position $z_i$ of interest and the correlation value $C_{an\_max}$ ($z_{i+1}$) at the peak position of the correlation function calculated for the observation position $z_{i+1}$ adjacent to the observation position $z_i$ of interest. This is the same as in the second embodiment.

Thereafter, the processor 31 calculates an average value $C_{an\_max}$(i) for all the positions of interest I while shifting the position of interest i in the scan range. When all the average values are calculated, the average value of the position of interest is normalized by the following expression so that the maximum average value is 1. $C_{an\_norm}$ (i) is a normalized average value. As described above, the present embodiment is different from the second embodiment in that the normalized average value is calculated for each area.

$$C_{an\_norm}(i) = \frac{C_{an\_max}(i)}{\max\{C_{an\_max}(z)\}} \quad (20)$$

The processor 31 excludes the combination of the position of interest and the area where the normalized average value is equal to or less than a threshold from the focus position. In other words, the processor 31 excludes information corresponding to the position of interest (observation position) where the correlation value at the correlation peak is below the threshold from the calculation processing for calculating the focus position to be performed thereafter. The threshold is, for example, 0.3. FIG. 31 illustrates a state in which the positions of interest to be excluded from the focus position have been selected for the area a4 using a threshold of 0.3. In this example, seven points of the positions of interest i=0, 1, 2, 3, 7, 8, and 9 are excluded for the area a4.

When the inappropriate focus positions are excluded from the estimated focus positions, the processor 31 determines the focus position of the entire image based on the estimated focus positions remaining after the exclusion (step S210).

In step S210, the processor 31 first calculates, for each area, the difference and the adjacent average of the focus positions in the same area calculated for the adjacent position of interest (observation position), using the following expression. Here, $Z_{an}^{(2)}$ (i) is the difference between the focus positions, and $Z_{best\_an}^{(ave)}$ (i) is the adjacent average of the focus positions.

$$Z_{an}^{(2)}(i) = z_{best_{an}}(i+1) - z_{best_{an}}(i) \tag{21}$$

$$Z_{best\_n}^{(ave)}(i) = \frac{z_{best\_an}(i) + z_{best\_an}(i+1)}{2} \tag{22}$$

FIG. 32 illustrates the difference and the adjacent average of the focus positions calculated for the area a4. When the difference and the adjacent average of the focus positions are calculated, as illustrated in FIG. 32, the processor 31 identifies the position of interest where the difference is the minimum for each area, and determines an adjacent average $Z_{best\_an\_eff}^{(ave)}$ (i) of the focus position related to the identified position of interest as the focus position of the area. In this example, i=4 is identified as the position of interest where the difference is the minimum, and the adjacent average of i=4 is determined as the focus position of the area a4.

Note that the purpose of identifying the position of interest where the difference between the focus positions is the minimum is to avoid a decrease in the estimation accuracy of the focus position due to the influence of disturbance. If the focus position is correctly estimated, the estimated focus position should be approximate regardless of the position of interest. Therefore, it is considered that the estimated focus position varies greatly due to the influence of disturbance when the difference in focus position is great between adjacent positions of interest, and it is not desirable to trust the focus position estimated at such adjacent positions of interest. On the other hand, in a case where the difference between the focus positions estimated at adjacent positions of interest is the minimum, such focus positions are substantially constant and a stable estimation result is obtained, and thus it can be determined that the focus positions are not affected by disturbance and are reliable. For the above reason, in the present embodiment, the focus position is identified using the focus position estimated at the adjacent positions of interest where the difference between the focus positions is the minimum.

In addition, the focus position in each area is as follows. In this example, since the focus position is calculated from the data of the areas a1, a4, a6, and a8 that are not excluded in step S209, only the focus positions of these areas are calculated.

$Z_{best\_a1\_eff}^{(ave)}(4)$=2109.0 pulses $Z_{best\_a4\_eff}^{(ave)}(4)$=2106.9 pulses $Z_{best\_a6\_eff}^{(ave)}(4)$=2110.9 pulses $Z_{best\_a8\_eff}^{(ave)}(4)$=2108.8 pulses Finally, the processor 31 determines the focus position of the entire image by averaging the calculated focus positions of all the areas (four focus positions in this example). In this example, the final focus position is 2109 pulses.

As described above, also in the system according to the present embodiment, the focus position can be accurately calculated without preparing detailed parameter information in advance, and the focus position can be calculated even in the environment where a plurality of contrast peaks can be formed, as in the systems according to the first embodiment and the second embodiment. Furthermore, in the system according to the present embodiment, the focus position in each area is correctly calculated by eliminating calculations across the areas as much as possible, and the focus position of the entire image is determined based on the calculated focus position. Therefore, a correct focus position can be calculated even when the subject is present in only local areas.

Fourth Embodiment

Figures 33, 34:
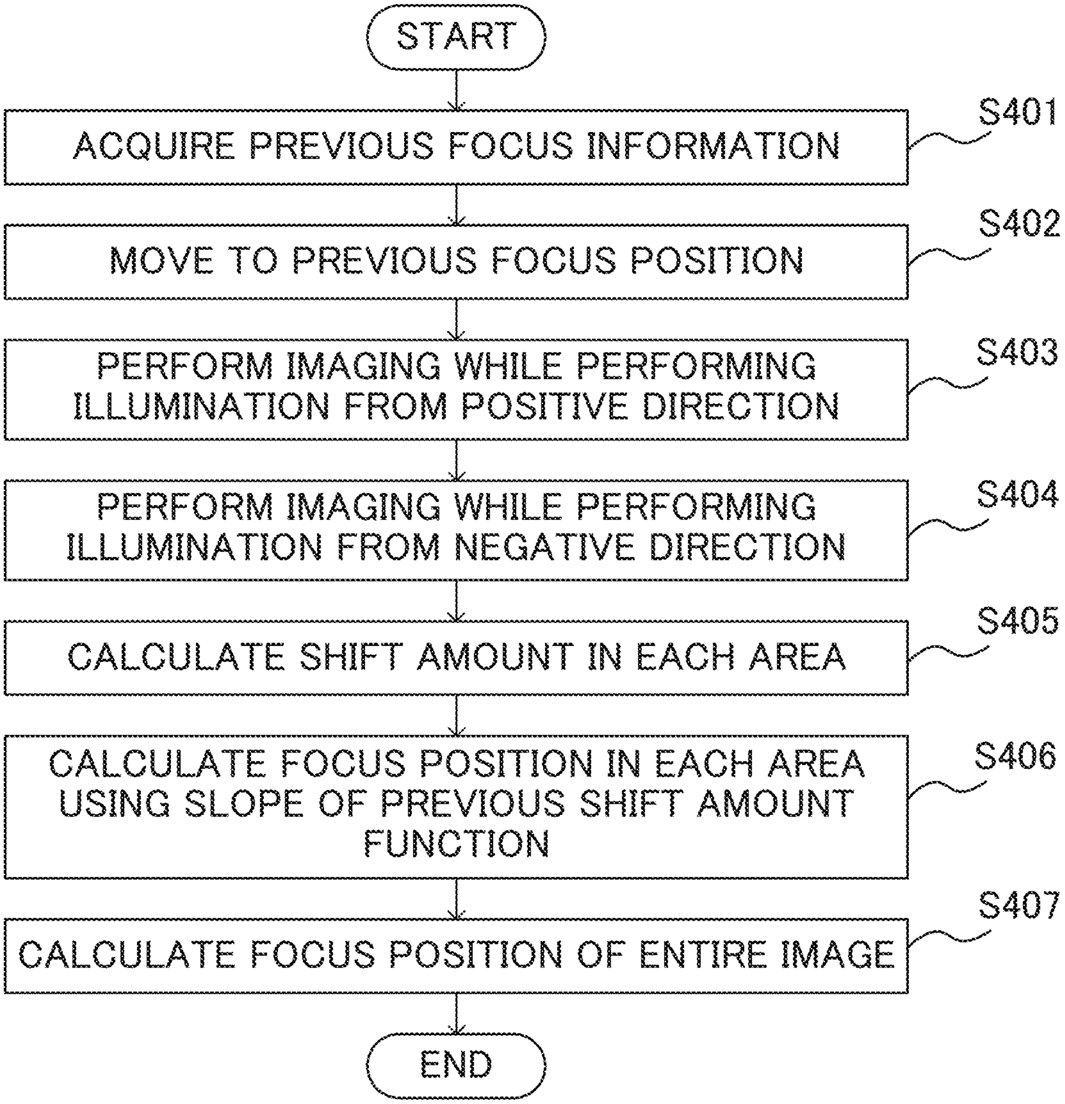
FIG. 33 is a flowchart of autofocus processing performed by a system according to a fourth embodiment.
FIG. 34 is a table illustrating focus information acquired in previous autofocus processing.

FIG. 33 is a flowchart of autofocus processing performed by a system according to a fourth embodiment. FIG. 34 is a table illustrating focus information acquired in previous autofocus processing. Hereinafter, processing performed by the system according to the present embodiment will be described with reference to FIGS. 33 and 34.

The system according to the present embodiment has the same configuration as the system according to the second embodiment, and is also the same as the system according to the second embodiment in that time-lapse imaging processing illustrated in FIG. 17 is performed. However, the system is different from the system according to the second embodiment in that autofocus processing illustrated in FIG. 33 is performed in the second and subsequent imaging for each imaging point.

FIG. 34 illustrates the focus position calculated in the autofocus processing performed at the time of the first imaging and the slope of the shift amount function in each area. The processor 31 stores these values in the storage device 32 at the time of the first imaging.

Hereinafter, the autofocus processing illustrated in FIG. 33 will be specifically described. Note that the autofocus processing illustrated in FIG. 33 enables high-speed focusing by greatly reducing the number of images acquired in the autofocus processing on the assumption that the slope of the shift amount function does not change significantly after the first imaging.

First, the processor 31 acquires previous focus information from the storage device 32 (step S401). As illustrated in FIG. 34, the focus information includes a focus position $Z_{eva}$ and a slope $k_{an\_eva}$ of the shift amount function in each area, which are previously calculated.

Next, the processor 31 controls the observation device 10 to move the observation position to the focus position $Z_{eva}$ acquired in step S401 (step S402), performs imaging while performing illumination from the positive direction (step S403), and further performs imaging while performing illumination from the negative direction (step S404). Furthermore, the processor 31 calculates the shift amount in each area from the obtained two preliminary images (step S405). The processing in step S405 is the same as that of the second embodiment and the same as step S201 to step S205 in FIG. 23.

When the shift amount in each area is calculated, the focus position in each area is calculated again using the focus information (step S406). Specifically, a focus position $Z_{best\_an\_eva}$ in each area is calculated by the following expression.

$$z_{best\_an\_eva} = z_{eva} - \frac{dy_{peak\_an}}{k_{an\_eva}} \tag{23}$$

Finally, the processor 31 calculates the focus position of the entire image by averaging the focus positions calculated for each area (step S407).

As described above, in the system according to the present embodiment, the imaging time can be greatly shortened because the second and subsequent autofocusing can be performed at high speed with a small number of images acquired.

In the above example, only one image group (one pair of preliminary images) is acquired in the second and subsequent autofocus processing, but two image groups (two pairs of preliminary images) may be acquired in the second and subsequent autofocus processing. In this case, observation positions where two image groups are acquired may be set near the previous focus position, and as a method of recalculating the focus position from the two image groups, for example, the method described in the first embodiment may be used. Also in a case where two image groups are acquired, the time required for the autofocus processing can be shortened as in a case where one image group is acquired.

The above-described embodiments are specific examples to facilitate an understanding of the invention, and hence the present invention is not limited to such embodiments. Modifications obtained by modifying the above-described embodiments and alternatives to the above-described embodiments may also be included. In other words, the constituent elements of each embodiment can be modified without departing from the spirit and scope of the embodiment. In addition, new embodiments can be implemented by appropriately combining a plurality of constituent elements disclosed in one or more of the embodiments. Furthermore, some constituent elements may be omitted from the constituent elements in each of the embodiments, or some constituent elements may be added to the constituent elements in each of the embodiments. Moreover, the order of the processing described in each of the embodiments may be changed as long as there is no contradiction. That is, the observation system, the focus position calculation method, and the program of the present invention can be variously modified and changed without departing from the scope of the invention defined by the claims.

In the above-described embodiments, the case where the observation device and the control device are separate devices has been exemplified, but the observation device and the control device may be configured as a single device. That is, the observation system may be configured as the observation device alone, and the control unit of the observation device may operate as the control device. In addition, the observation device is not limited to the device exemplified in the above-described embodiments, and may be, for example, a microscope device having an autofocus function. The microscope device may be an upright microscope device or an inverted microscope device. The microscope device may be a transmission type microscope device or an epi-illumination type microscope device.

In the above-described embodiments, the example in which two preliminary images are acquired for each observation position has been described, but three or more preliminary images may be acquired. In addition, the example in which the sample S is illuminated from two directions that are 180° different from each other to acquire the preliminary image has been described, but the sample S may be illuminated from three or more different directions to acquire the preliminary image.

Furthermore, in the second embodiment and the third embodiment, the example in which the focus position is calculated after excluding information inappropriate for determining the focus position has been described, but the processing of excluding the information inappropriate for determining the focus position may be performed in the first embodiment.

What is claimed is:

1. An observation system comprising:

an illumination device that includes a plurality of light sources and that illuminates an observation object with illumination light from a plurality of different directions;

an imaging device that includes an objective that condenses light from the observation object and that images the observation object with the light condensed by the objective; and a control unit that calculates a focus position of the imaging device based on a plurality of image groups acquired by the imaging device at observation positions different from each other in an optical axis direction of the objective, each of the plurality of image groups including a plurality of images of the observation object illuminated from directions different from each other by the illumination device, wherein:

the control unit is configured to execute processing comprising:

shift amount calculation processing of calculating a shift amount between the plurality of images in a direction orthogonal to the optical axis of the objective based on the plurality of images; and focus position calculation processing of calculating the focus position based on a plurality of shift amounts calculated in the shift amount calculation processing and corresponding to observation positions different from each other in the optical axis direction, the shift amount calculation processing includes:

processing of calculating a correlation between a plurality of regions, each of which is a portion of one of the plurality of images; and processing of calculating the shift amount from a positional relationship between the plurality of regions where the correlation indicates a peak, the shift amount calculation processing further includes processing of calculating a correlation value at the peak, and the focus position calculation processing includes processing of calculating the focus position based on the plurality of shift amounts and a plurality of correlation values calculated in the shift amount calculation processing and corresponding to observation positions different from each other in the optical axis direction.

2. The observation system according to claim 1, wherein the focus position calculation processing further includes processing of excluding information corresponding to an observation position where a correlation value at the peak is below a threshold from calculation processing for calculating the focus position.

3. The observation system according to claim 1, wherein the focus position calculation processing includes:

processing of estimating an observation position where the shift amount is zero; and processing of identifying the focus position based on the estimated observation position where the shift amount is zero.

4. The observation system according to claim 1, wherein the control unit further performs image acquisition processing of controlling the illumination device and the imaging device to acquire the plurality of images by switching an illumination direction at each observation position.

5. The observation system according to claim 1, wherein the control unit further performs focus image acquisition processing of controlling the illumination device and the imaging device to acquire an image at the focus position.

6. The observation system according to claim 1, further comprising:

a storage unit that stores information on a container that houses the observation object, wherein the control unit determines a range of the observation position in the optical axis direction based on the information on the container stored in the storage unit.

7. An observation system comprising:

an illumination device that includes a plurality of light sources provided at symmetrical positions with respect to an optical axis of an objective that condenses light from an observation object, and that selectively causes the plurality of light sources to emit light to illuminate the observation object with the illumination light from two symmetrical directions;

an imaging device that includes the objective and that images the observation object with the light condensed by the objective; and a control unit that calculates a focus position of the imaging device based on a plurality of image groups acquired by the imaging device at observation positions different from each other in the optical axis direction of the objective, each of the plurality of image groups including a plurality of images of the observation object illuminated from the two symmetrical directions by the illumination device, wherein the control unit is configured to execute processes comprising:

shift amount calculation processing of calculating a shift amount between the plurality of images in a direction orthogonal to the optical axis of the objective based on the plurality of images; and focus position calculation processing of calculating the focus position based on a plurality of shift amounts calculated in the shift amount calculation processing and corresponding to observation positions different from each other in the optical axis direction.

8. The observation system according to claim 7, wherein the shift amount calculation processing further includes image conversion processing of converting each of the plurality of images into a positive contrast image or a negative contrast image.

9. The observation system according to claim 7, wherein the shift amount calculation processing includes:

processing of calculating a correlation between a plurality of regions, each of which is a portion of one of the plurality of images; and processing of calculating the shift amount from a positional relationship between the plurality of regions where the correlation indicates a peak.

10. The observation system according to claim 9, wherein:

the shift amount calculation processing further includes processing of calculating a correlation value at the peak, and the focus position calculation processing includes processing of calculating the focus position based on the plurality of shift amounts and a plurality of correlation values calculated in the shift amount calculation processing and corresponding to observation positions different from each other in the optical axis direction.

11. The observation system according to claim 10, wherein the focus position calculation processing further includes processing of excluding information corresponding to an observation position where a correlation value at the peak is below a threshold from calculation processing for calculating the focus position.

12. The observation system according to claim 7, wherein the focus position calculation processing includes:

processing of estimating an observation position where the shift amount is zero; and processing of identifying the focus position based on the estimated observation position where the shift amount is zero.

13. The observation system according to claim 7, wherein the control unit further performs image acquisition processing of controlling the illumination device and the imaging device to acquire the plurality of images by switching an illumination direction at each observation position.

14. The observation system according to claim 7, wherein the control unit further performs focus image acquisition processing of controlling the illumination device and the imaging device to acquire an image at the focus position.

15. The observation system according to claim 7, further comprising:

a storage unit that stores information on a container that houses the observation object, wherein the control unit determines a range of the observation position in the optical axis direction based on the information on the container stored in the storage unit.

16. A focus position calculation method, the method comprising:

calculating, by a computer, a focus position of an imaging device that images an observation object based on a plurality of image groups acquired by the imaging device at observation positions different from each other in an optical axis direction of an objective included in the imaging device, each of the plurality of image groups including a plurality of images of the observation object illuminated from directions different from each other by an illumination device that includes a plurality of light sources, wherein:

the calculating comprises:

shift amount calculation processing of calculating a shift amount between the plurality of images in a direction orthogonal to the optical axis of the objective based on the plurality of images; and focus position calculation processing of calculating the focus position based on a plurality of shift amounts calculated in the shift amount calculation processing and corresponding to observation positions different from each other in the optical axis direction, the shift amount calculation processing includes:

processing of calculating a correlation between a plurality of regions, each of which is a portion of one of the plurality of images; and processing of calculating the shift amount from a positional relationship between the plurality of regions where the correlation indicates a peak, the shift amount calculation processing further includes processing of calculating a correlation value at the peak, and the focus position calculation processing includes processing of calculating the focus position based on the plurality of shift amounts and a plurality of correlation values calculated in the shift amount calculation processing and corresponding to observation positions different from each other in the optical axis direction.

17. A non-transitory computer-readable medium storing a program for causing a computer to execute processing comprising:

processing of calculating a focus position of an imaging device that images an observation object based on a plurality of image groups acquired by the imaging device at observation positions different from each other in an optical axis direction of an objective included in the imaging device, each of the plurality of image groups including a plurality of images of the observation object illuminated from directions different from each other by an illumination device that includes a plurality of light sources, wherein:

the processing of calculating the focus position comprises:

shift amount calculation processing of calculating a shift amount between the plurality of images in a direction orthogonal to the optical axis of the objective based on the plurality of images; and focus position calculation processing of calculating the focus position based on a plurality of shift amounts calculated in the shift amount calculation processing and corresponding to observation positions different from each other in the optical axis direction, the shift amount calculation processing includes:

processing of calculating a correlation between a plurality of regions, each of which is a portion of one of the plurality of images; and processing of calculating the shift amount from a positional relationship between the plurality of regions where the correlation indicates a peak, the shift amount calculation processing further includes processing of calculating a correlation value at the peak, and the focus position calculation processing includes processing of calculating the focus position based on the plurality of shift amounts and a plurality of correlation values calculated in the shift amount calculation processing and corresponding to observation positions different from each other in the optical axis direction.

* * * * *